United States Patent
Kim et al.

(10) Patent No.: US 11,769,882 B2
(45) Date of Patent: Sep. 26, 2023

(54) MULTI-LAYERED COATED ELECTRODE FOR LITHIUM-ION BATTERY

(71) Applicant: A123 Systems, LLC, Waltham, MA (US)

(72) Inventors: Tae Kyoung Kim, Lexington, MA (US); Jun Wang, Shrewsbury, MA (US); Ronnie Wilkins, Melrose, MA (US); Jordan Rubio, Jamaica Plain, MA (US); Ankita Faulkner, Framingham, MA (US); Zaiyuan Le, Waltham, MA (US); Xiqing Wang, Windermere, FL (US); Ting Huang, Acton, MA (US)

(73) Assignee: A123 SYSTEMS, LLC, Waltham, MA (US)

( * ) Notice: Subject to any disclaimer, the term of this patent is extended or adjusted under 35 U.S.C. 154(b) by 149 days.

(21) Appl. No.: 17/354,959

(22) Filed: Jun. 22, 2021

(65) Prior Publication Data

US 2021/0399308 A1    Dec. 23, 2021

Related U.S. Application Data

(60) Provisional application No. 63/042,950, filed on Jun. 23, 2020.

(51) Int. Cl.
*H01M 4/00* (2006.01)
*H01M 4/66* (2006.01)
(Continued)

(52) U.S. Cl.
CPC ......... *H01M 4/663* (2013.01); *H01M 4/0404* (2013.01); *H01M 4/505* (2013.01);
(Continued)

(58) Field of Classification Search
CPC ........ H01M 4/62; H01M 4/505; H01M 4/525; H01M 10/0525
See application file for complete search history.

(56) References Cited

U.S. PATENT DOCUMENTS

| 8,017,228 B2 | 9/2011 | Drzal et al. |
| 2009/0291366 A1* | 11/2009 | Stevanovic ........... H01M 4/136 |
| | | 429/231.95 |

(Continued)

FOREIGN PATENT DOCUMENTS

| CN | 110492102 A | * 11/2019 | ........ H01M 10/0525 |
| JP | 2020053278 A | * 4/2020 | |
| WO | 2011109815 A1 | 9/2011 | |

OTHER PUBLICATIONS

Zhao, A Lithium Ion Battery Pole Piece And Preparation Method Thereof And Lithium Ion Battery, p. 1. (Year: 2019).*
Okamura, Drying Device, p. 1. (Year: 2020).*

*Primary Examiner* — Cynthia H Kelly
*Assistant Examiner* — Monique M Wills
(74) *Attorney, Agent, or Firm* — McCoy Russell LLP

(57) ABSTRACT

Systems and methods are provided for an electrode for a lithium-ion battery cell. In one example, the electrode may include a current collector having two opposing sides, at least one of the two opposing sides being configured with a first coating layer disposed on the current collector at a first loading, where the first coating layer may include a first binder in a first weight ratio, and a second coating layer disposed on the first coating layer at a second loading, where the second coating layer may include a second binder in a second weight ratio, wherein the first weight ratio may be greater than the second weight ratio, and a ratio of the first loading to the second loading may be less than 1:2. In this way, direct current internal resistance of the lithium-ion (Continued)

battery cell may be decreased while maintaining or increasing adhesion within the electrode.

20 Claims, 6 Drawing Sheets

(51) Int. Cl.
  *H01M 4/04* (2006.01)
  *H01M 10/0525* (2010.01)
  *H01M 4/505* (2010.01)
  *H01M 4/525* (2010.01)
  *H01M 4/62* (2006.01)
(52) U.S. Cl.
  CPC ........... *H01M 4/525* (2013.01); *H01M 4/623* (2013.01); *H01M 10/0525* (2013.01)

(56) References Cited

U.S. PATENT DOCUMENTS

| 2016/0372743 | A1 | 12/2016 | Cho et al. |
| 2018/0151872 | A1 | 5/2018 | Zhamu et al. |
| 2019/0027740 | A1 | 1/2019 | Lee et al. |
| 2019/0140258 | A1 | 5/2019 | Burshtain et al. |

* cited by examiner

MULTI-LAYERED COATED ELECTRODE FOR LITHIUM-ION BATTERY

CROSS REFERENCE TO RELATED APPLICATIONS

The present application claims priority to U.S. Provisional Application No. 63/042,950, entitled "MULTI-LAYERED COATED ELECTRODE FOR LITHIUM-ION BATTERY," and filed on Jun. 23, 2020. The entire contents of the above-identified application are hereby incorporated by reference for all purposes.

FIELD

The present description relates generally to a coated electrode for a lithium-ion battery cell, wherein the coated electrode includes multiple coating layers.

BACKGROUND AND SUMMARY

Lithium-ion (Li-ion) battery cells are being increasingly used in electric and hybrid-electric vehicles. Especially in fully electric vehicles, Li-ion battery cells with higher energy densities are sought after to increase a duration between recharging. Accordingly, structural and compositional features may be contemplated which maximize the energy density of a given Li-ion battery cell.

For example, electrodes may be developed which maximize coating weights on current collectors therein. However, challenges persist in manufacturing Li-ion battery cells including such electrodes. Specifically, increased coating weights may increase direct current internal resistance (DCIR) at beginning-of-life, as well as DCIR growth during cycling (as a result of slower kinetics).

Attempts to resolve such challenges include decreasing an amount of binder included in the coatings, which may improve power and rate capabilities by lowering the DCIR. In some examples, such reductions in the DCIR may be achieved by proportionally increasing an amount of conductive additive in the coatings. That is, a ratio of the amount of conductive additive to the amount of binder in a given coating may be increased to decrease the DCIR of the overall battery cell. As such, faster charging and higher power may be realized. In additional or alternative examples, the amount of binder and/or the amount of conductive additive may be decreased and an amount of active material may be increased in the coatings, which may further improve the energy density. A composition of the active material may be selected to achieve additional energy density increases, for example, silicon-based materials may be employed in anodes and high-nickel $Li_aNi_{1-x-y}Mn_xCo_yO_2$ (NMC or NCM) or $Li_aNi_{1-x-y}Co_xAl_yO_2$ (NCA) may be employed in cathodes.

The inventors herein have recognized potential issues with such electrodes. Specifically, reducing the amount of binder in a given coating may correspondingly reduce adhesion of the coating to a current collector in the electrode. Such reduced adhesion may result in delamination of the coating from the current collector during formation of the electrode and the Li-ion battery cell including the electrode.

The inventors have identified the above problems and have determined solutions to at least partially solve them. In one example, a multi-layered coated electrode is provided which includes a current collector coated with at least two coating layers on each of two opposing surfaces of the current collector. In some examples, a first coating layer may be disposed directly on each of the two opposing surfaces, and a second coating layer may be disposed on each of the first coating layers, such that the first coating layers may be respectively interposed between the second coating layers and the current collector.

Each of the first and second coating layers may include an amount of binder and an amount of conductive additive, wherein the amount of binder in the first coating layer may be greater than the amount of binder in the second coating layer, and wherein the second coating layer may have a higher loading than the first coating layer. Further, in some examples, the first coating layer may include no active material, such that each of the amount of binder and the amount of conductive additive may be maximized therein and a thickness of the first coating layer may be minimized to help reduce an electrical resistance between the current collector and the second coating layer. In this way, an adhesion at an interface between the current collector and the first coating layer may be increased, while an overall amount of binder in the first and second coating layers may be decreased, for example, by the higher loading of the second coating layer (which has a lower amount of binder). Further, trends in electrochemical performance may be balanced by the increased amount of conductive additive, which may increase conductivity and further decrease DCIR. In further examples, the first and second coating layers may be simultaneously coated onto the current collector prior to drying of the first and second coating layers. Such a "wet-on-wet" coating technique may additionally improve adhesion between the first and second coating layers via formation of an intermixed interfacial region.

In some examples, one or both of the first and second coating layers may include an active material having a maximum calendering density of greater than or equal to 1.7 g/cc. As such, an overall calendering density of the first and second coating layers may be correspondingly increased, for example, to greater than or equal to 1.7 g/cc. In this way, an energy density of the multi-layered coated electrode may be increased via formation of thinner coatings having higher loadings. Further, in some examples, a bimodal particle size distribution of active material particles may be included in the first and second coating layers, such that smaller active material particles may fill gaps formed between larger active material particles, and the energy density of the multi-layered coated electrode may further be increased.

In one example, an electrode may include a current collector having two opposing sides, wherein at least one of the two opposing sides may be configured with a first coating layer disposed on the current collector at a first loading or coating weight of the first coating layer, where the first coating layer may include a first binder and a first conductive additive in a first ratio, and a second coating layer disposed on the first coating layer at a second loading or coating weight of the second coating layer, such that the first coating layer may be interposed between the current collector and the second coating layer, where the second coating layer may include a second binder and a second conductive additive in a second ratio, wherein each of the first and second coating layers further comprises an electrochemically active material in the form of particles, particles of the electrochemically active material in a thicker coating layer of the first and second coating layers having a lower D50 size than particles of the electrochemically active material in a thinner coating layer of the first and second coating layers, wherein the first ratio may be greater than the second ratio, and wherein a ratio of the first loading to the second loading may be less than 1:2. In this way, DCIR in a Li-ion battery cell including the electrode may be decreased while adhesion at interfaces between the current collector and the coating layers may be maintained or improved, thus mitigating delamination issues during electrode build, immersing and soaking of the electrode with an electrolyte, formation of the Li-ion battery cell, and long-term cycle life testing of the Li-ion battery cell.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for a multi-layered coated electrode for a lithium-ion secondary battery. The multi-layered coated electrode may include a current collector having one or more coating layers disposed thereon, such that the one or more coating layers may form a sequentially-layered configuration with respect to the current collector.

In one example, a first coating layer may be disposed on a surface of the current collector, and a second coating layer may be disposed on the first coating layer opposite to the current collector, such that the first coating layer may be interposed between the second coating layer and the current collector. In some examples, a "wet-on-wet" coating technique may be applied wherein the first coating layer and the second coating layer may be respectively disposed onto the current collector and the first coating layer prior to drying of either coating layer.

The first coating layer and second coating layer may include a binder and a conductive additive at a first ratio and a second ratio, respectively. In some examples, the first ratio may be greater than the second ratio. Further, the first coating layer may be disposed on the current collector at a first loading or coating weight as measured in a dry state, and the second coating layer may be disposed on the first coating layer at a second loading or coating weight as measured in a dry state. In some examples, the second loading may be greater than the first loading (for example, a ratio of the first loading to the second loading may be less than 1:2). In this way, a direct current internal resistance (DCIR) of the lithium-ion secondary battery may be decreased (by minimizing binder content further from the current collector) while adhesion at interfaces between the current collector, the first coating layer, and the second layer may be increased (by increasing binder content closer to the current collector and by forming the first and second coating layers simultaneously via the "wet-on-wet" coating technique).

Figure 1:
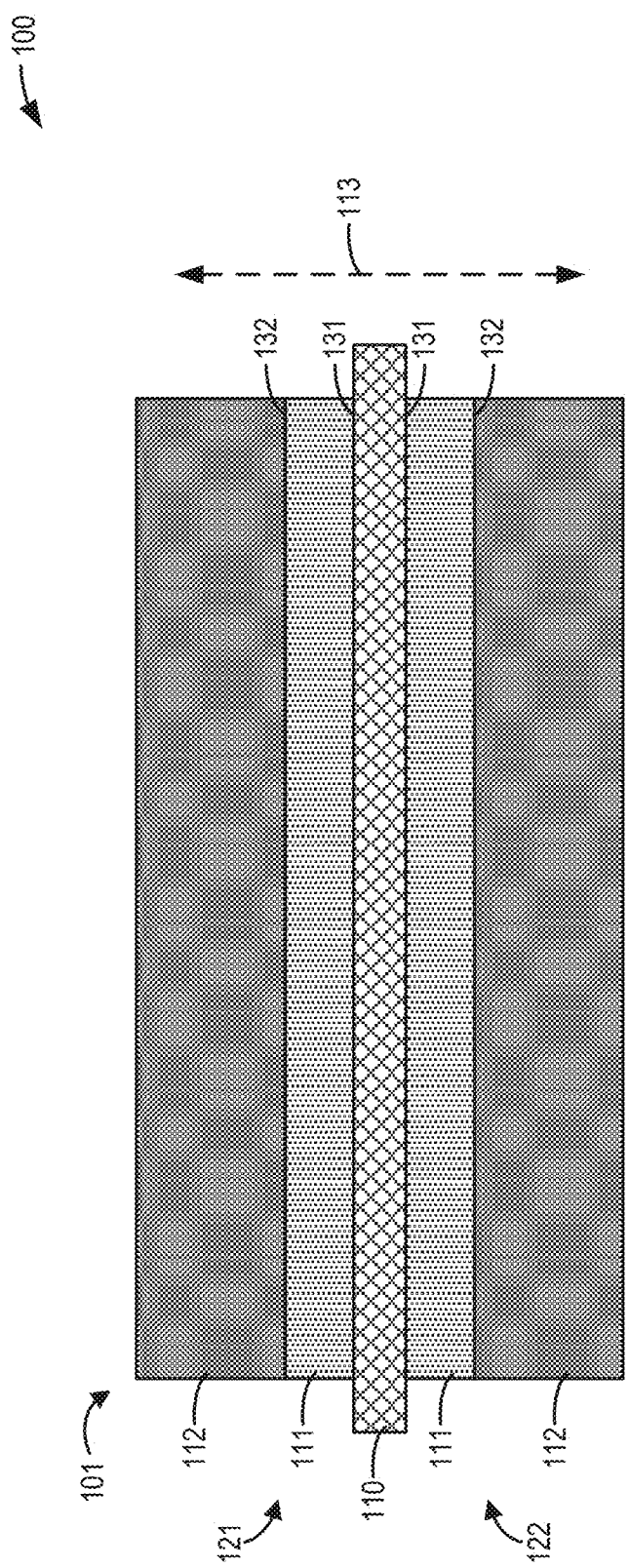
FIG. 1 shows a schematic diagram of a multi-layered coated electrode.
Figure 2:
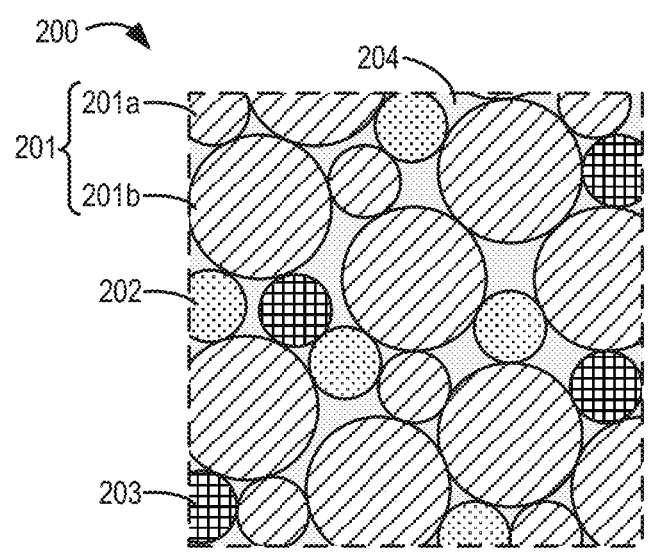
FIG. 2 shows a cross-sectional view of particles included in the multi-layered coated electrode.
Figure 3:
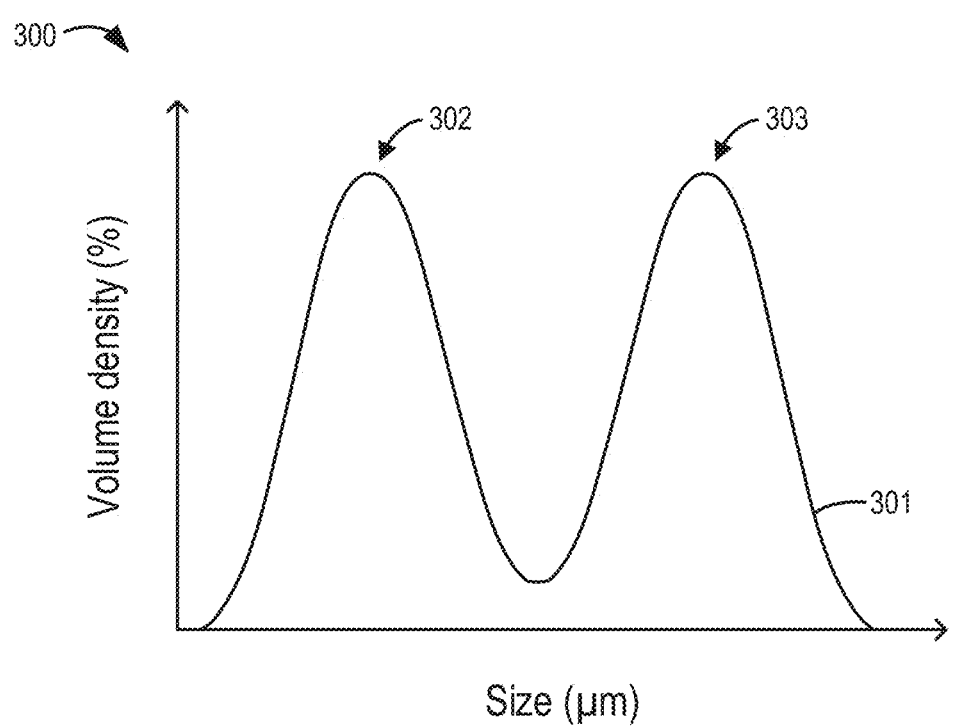
FIG. 3 shows a plot depicting a particle size distribution of the particles included in the multi-layered coated electrode.

FIG. 1 schematically depicts one example of the multi-layered coated electrode. As shown, the multi-layered coated electrode may include a current collector having multiple coating layers disposed on opposite sides of the current collector. A cross-sectional view of an exemplary coating layer of the multi-layered coated electrode is depicted in FIG. 2, where a configuration of particles forming the exemplary coating layer is shown. The particles may have a bimodal particle size distribution (PSD), as depicted by the plot of FIG. 3.

Figures 4, 5:
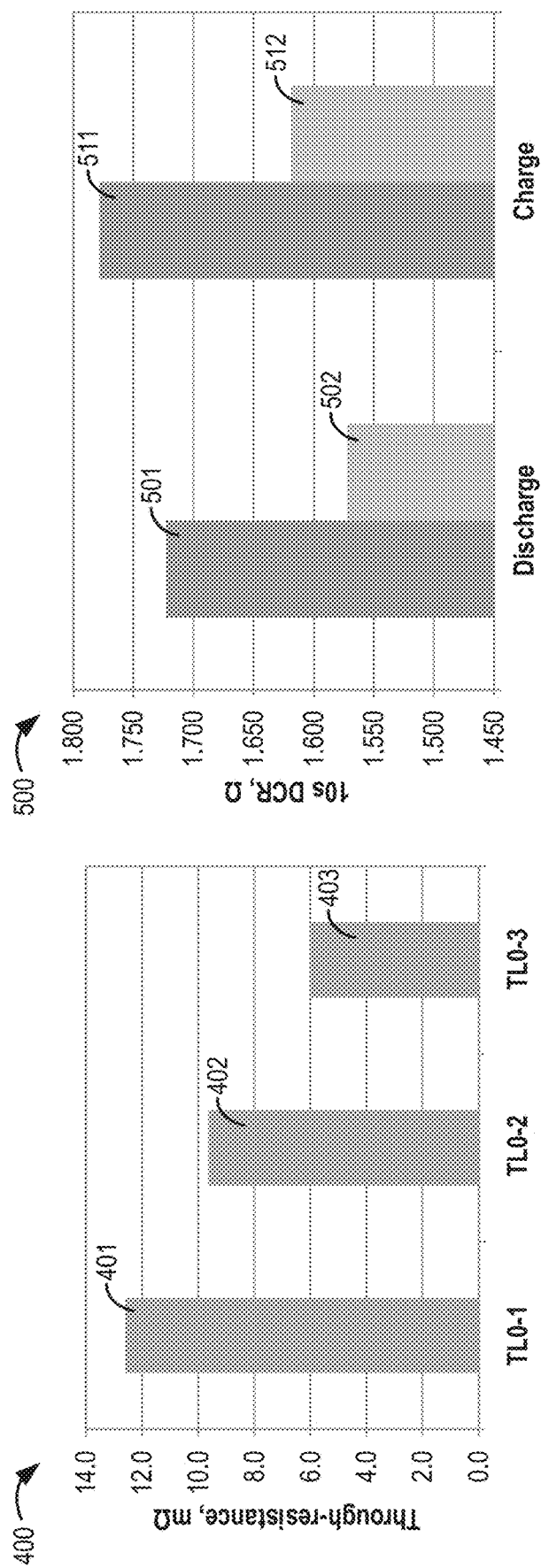
FIG. 4 shows a plot depicting electrical resistance for each of three exemplary coated electrodes.
FIG. 5 shows a plot depicting direct current internal resistance during charging and discharging pulses of each of two exemplary coated electrodes.
Figure 6:
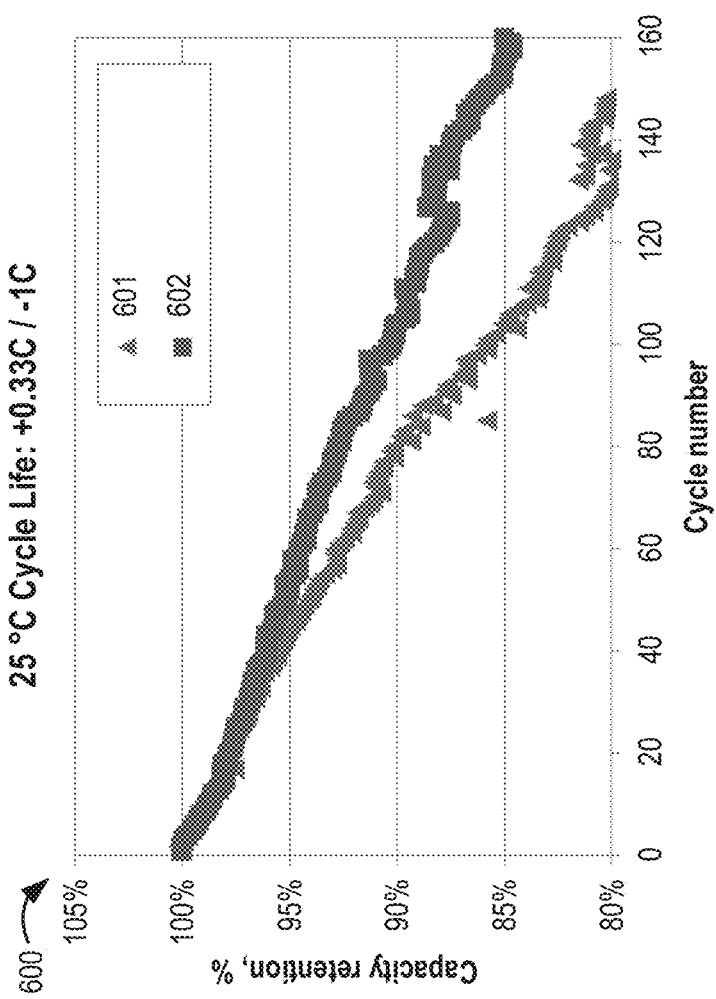
FIG. 6 shows a plot depicting capacity retention during cycling of each of two exemplary coated electrodes.

Comparative data are provided in FIGS. 4-6 for various exemplary coated electrodes. Specifically, FIG. 4 shows a plot depicting electrical resistance, FIG. 5 shows a plot depicting DCIR during charging and discharging pulses, and FIG. 6 shows a plot depicting capacity retention during cycling.

Figure 7:
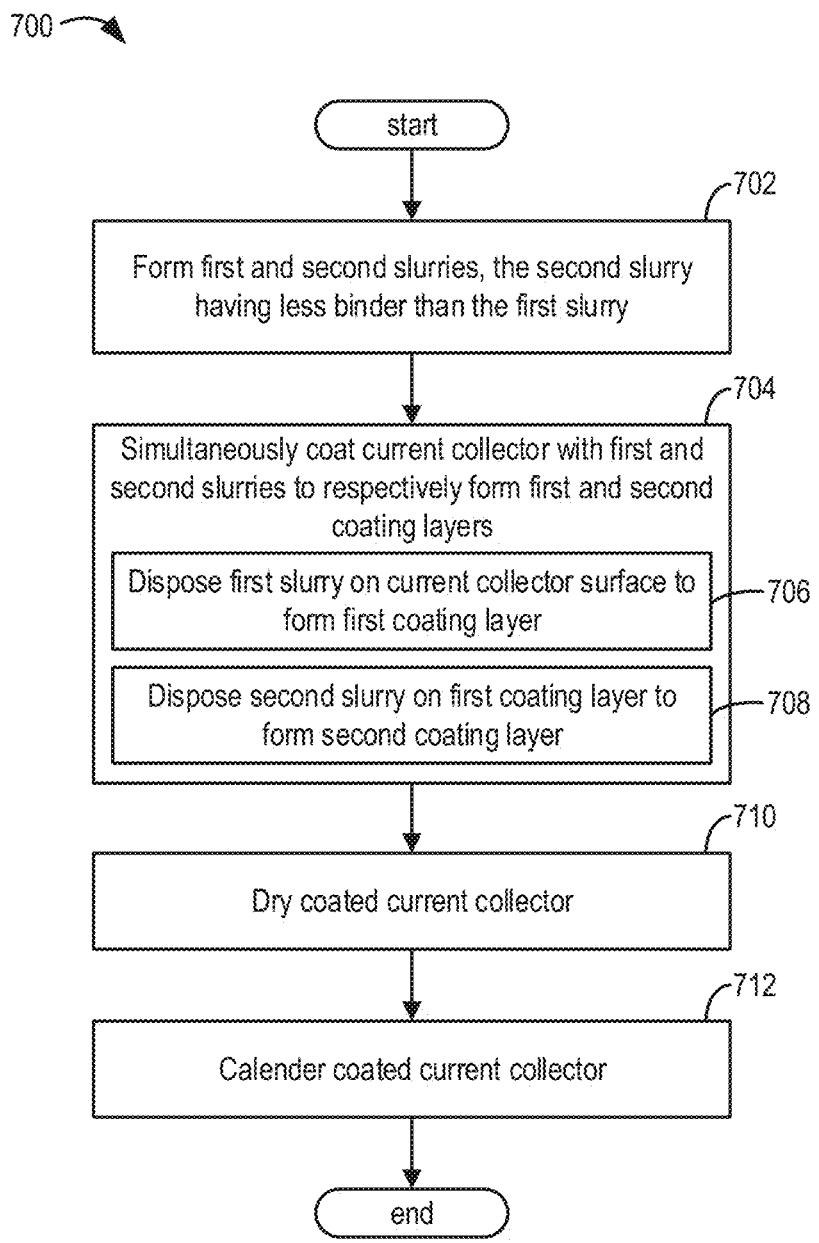
FIG. 7 shows a flow chart of a method for forming the multi-layered coated electrode via simultaneous deposition of multiple slurries onto a current collector.
Figure 8:
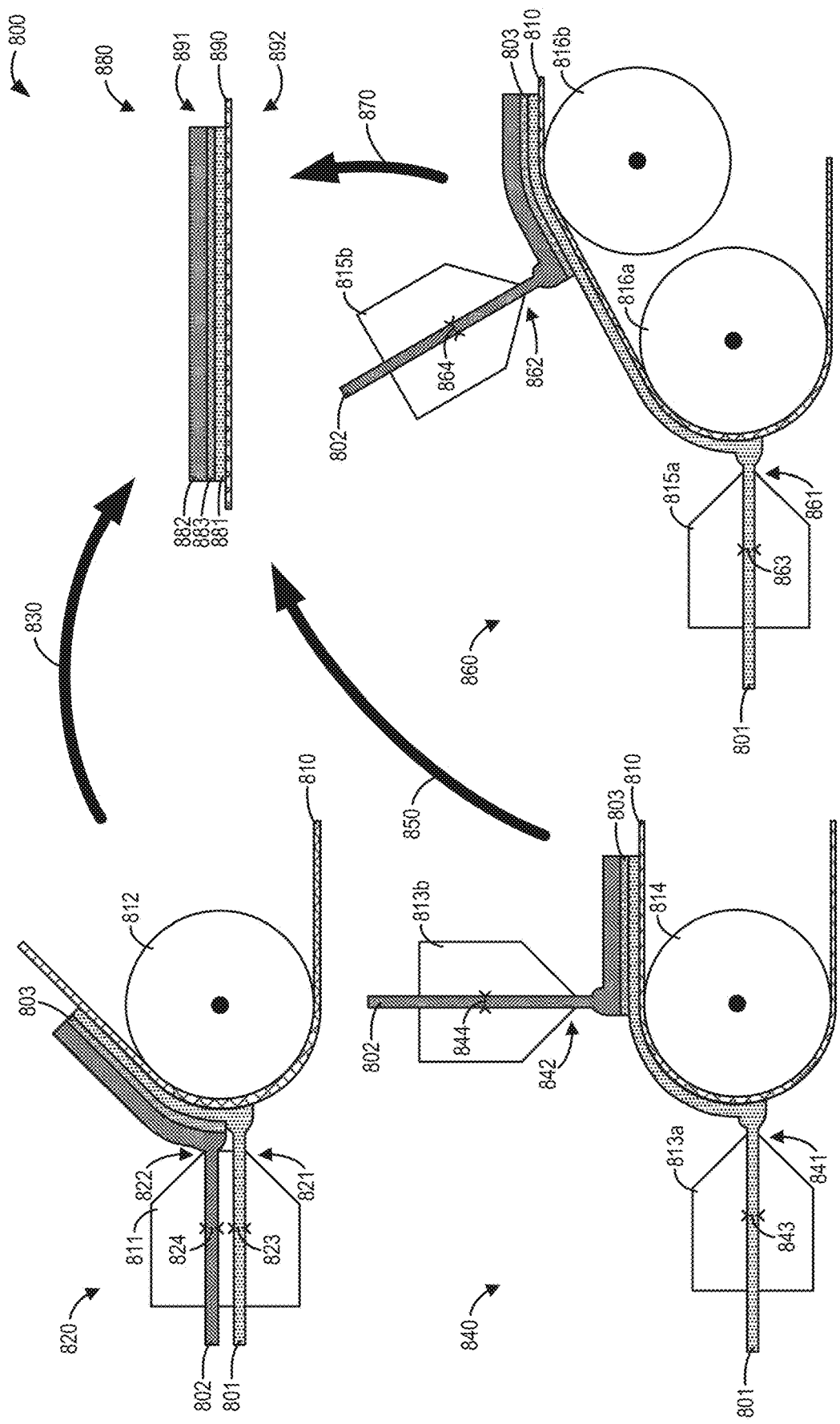
FIG. 8 shows a schematic diagram of three exemplary slot die configurations for simultaneously depositing two slurries onto a current collector sheet.

FIG. 7 provides a method for simultaneously coating multiple coating layers on the current collector prior to drying the coating layers. Slot die configurations for performing a coating step of the method of FIG. 7 are depicted in FIG. 8.

Referring now to FIG. 1, a schematic diagram 100 illustrating a multi-layered coated electrode 101 for use in a battery cell is shown. In some examples, the multi-layered coated electrode 101 may be a positive electrode (cathode), and in other examples, the multi-layered coated electrode 101 may be a negative electrode (anode). Upon formation, the multi-layered coated electrode 101 may be positioned in the battery cell, for example, in a lithium-ion battery cell, such that the multi-layered coated electrode 101 may provide power to the battery cell. In some examples, the battery cell may be one of a plurality of battery cells in a battery pack, where each of the plurality of battery cells may have substantially similar configurations ("substantially" may be used herein as a qualifier meaning "effectively").

The multi-layered coated electrode 101 may include a current collector 110 having a first side 121 and a second side 122, where the sides 121, 122 are opposite to one another. The current collector 110 may have a first coating layer 111 disposed on one or both of the sides 121, 122, such that the first coating layer 111 may be in face-sharing contact with the current collector 110. Further, on one or both of the sides 121, 122 a second coating layer 112 may be disposed on the first coating layer 111, such that the second coating layer 112 may be in face sharing contact with the first coating layer 111 and the first coating layer 111 may be interposed between the current collector 110 and the second coating layer 112. As such, in some examples, sequentially along an axis 113 parallel to a smallest dimension of the current collector 110, the multi-layered coated electrode 101 may include the second coating layer 112, the first coating layer 111, the current collector 110, the first coating layer 111, and the second coating layer 112. Accordingly, in some examples, on one or both of the sides 121, 122, the first coating layer 111 may be positioned between the current collector 110 and the second coating layer 112 with respect to the axis 113.

The current collector 110 may be a metal sheet or foil, such as copper foil, nickel foil, aluminum foil, etc., or any other configuration which may conduct electricity and permit current flow therethrough. In some examples, the current collector 110 may further include a carbon coating on the metal sheet or foil (e.g., the current collector 110 may be a carbon-coated aluminum foil or a carbon-coated copper foil). In one example, the carbon coating may include no binder (e.g., the carbon coating may be bound to the metal sheet or foil via an alternate method, such as via chemical vapor deposition). In other examples, the current collector 110 may include no carbon coating (e.g., the current collector 110 may be a pristine metal sheet or foil). Further, a composition of the current collector 110 may be different based on whether the multi-layered coated electrode 101 is employed as a cathode or an anode. In one example where the multi-layered coated electrode 101 is a cathode, the current collector 110 may be aluminum foil. In one example where the multi-layered coated electrode 101 is an anode, the current collector 110 may be copper foil. Specifically, copper foil may be selected for anodic configurations, as copper foil may not intercalate lithium ions at lower voltages during battery cell operation. It will be appreciated that the current collector 110 may be varied widely in thickness, for example, up to 500 µm, within the scope of the present disclosure. In one example, the thickness of the current collector 110 may be about 10 µm. As used herein, "about" or "approximately" when referring to a quantitative property or numerical value may encompass a deviation of 5% or less.

For a given side 121, 122 of the current collector 110, the first coating layer 111 may be disposed on the current collector 110 at a first loading or coating weight and the second coating layer 112 may be disposed on the first coating layer 111 at a second loading or coating weight. In some examples, based on a coating weight on one side of the current collector 110, the first loading may be less than 100 g/m$^2$. In some examples, the first loading may be greater than 1 g/m$^2$ and less than 80 g/m$^2$. In some examples, the first loading may be greater than 1 g/m$^2$ and less than 60 g/m$^2$. In some examples, the first loading may be greater than 1 g/m$^2$ and less than 20 g/m$^2$.

In some examples, based on a coating weight on one side of the current collector 110, the second loading may be less than 250 g/m$^2$. In some examples (for instance, when the multi-layered coated electrode 101 is an anode including silicon), the second loading may be as low as 20 g/m$^2$. In some examples, the second loading may be greater than 20 g/m$^2$ and less than 225 g/m$^2$. In some examples, the second loading may be greater than 20 g/m$^2$ and less than 200 g/m$^2$. In some examples, the second loading may be greater than 20 g/m$^2$ and less than 150 g/m$^2$.

In some examples, the second loading may be greater than the first loading. Accordingly, a ratio of the first loading to the second loading may be less than 1:1. In some examples, the ratio of the first loading to the second loading may be less than 1:2. In some examples, the ratio of the first loading to the second loading may be greater than or equal to 1:100 and less than 1:2. In some examples, the ratio of the first loading to the second loading may be greater than or equal to 1:100 and less than or equal to 1:3. In some examples, the ratio of the first loading to the second loading may be greater than or equal to 1:20 and less than or equal to 1:3. In some examples, the ratio of the first loading to the second loading may be about 1:4, 1:10, 1:20, or 1:100.

Upon coating, the first coating layer 111 and the second coating layer 112 may be calendered at a first calendering density and a second calendering density, respectively. In some examples, the first calendering density may be greater than 1.0 g/cc and less than 3.5 g/cc. In some examples, the first calendering density may be greater than 1.5 g/cc and less than 2.5 g/cc. In some examples, the first calendering density may be greater than 1.6 g/cc and less than 2.0 g/cc. In some examples, the first calendering density may be greater than or equal to 1.7 g/cc. In some examples, the first calendering density may be greater than 1.7 g/cc. In some examples, the first calendering density may be greater than 1.75 g/cc. In some examples, the first calendering density may be greater than 2.0 g/cc. In some examples, the first calendering density may be greater than 3.0 g/cc.

In some examples, the second calendering density may be greater than 1.0 g/cc and less than 3.5 g/cc. In some examples, the second calendering density may be greater than 1.5 g/cc and less than 2.5 g/cc. In some examples, the second calendering density may be greater than 1.6 g/cc and less than 2.0 g/cc. In some examples, the second calendering density may be greater than or equal to 1.7 g/cc. In some examples, the second calendering density may be greater than 1.7 g/cc. In some examples, the second calendering density may be greater than 1.75 g/cc. In some examples, the second calendering density may be greater than 2.0 g/cc. In some examples, the second calendering density may be greater than 3.0 g/cc.

In some examples, an average calendering density of the first and second coating layers 111, 112 may be greater than 1.0 g/cc and less than 3.5 g/cc. In some examples, the average calendering density may be greater than 1.5 g/cc and less than 2.5 g/cc. In some examples, the average calendering density may be greater than 1.55 g/cc and less than 2.0 g/cc. In some examples, the average calendering density may be greater than 1.6 g/cc and less than 2.0 g/cc. In some examples, the average calendering density may be greater than or equal to 1.7 g/cc. In some examples, the average calendering density may be greater than 1.7 g/cc. In some examples, the average calendering density may be greater than 1.75 g/cc. In some examples, the average calendering density may be greater than 2.0 g/cc. In some examples, the average calendering density may be greater than 3.0 g/cc. In certain examples where the multi-layered coated electrode 101 is the negative electrode, the average calendering density may be limited to between 1.6 g/cc and 2.0 g/cc.

As used herein, "calendering density" may refer to a density of a given electrode measured within one minute of calendering. Similarly, "calendering thickness" may refer to a thickness of a given electrode measured within one minute of calendering. Accordingly, higher calendering densities of the coating layers may be desirable, as an energy density of the multi-layered coated electrode 101 may concomitantly increase due to denser, thinner coating layers. However, it will be appreciated that the calendering densities may depend on a composition of the respective coating layers. For example, a given coating layer may include an active material having a density of about 2.2-2.3 g/cc, which may increase manufacturing difficulties in obtaining calendering densities near 2.2-2.3 g/cc without wrinkles or foil breakage in the coating layers during calendering. Further, coating and calendering of the current collector 110 during electrode formation may result in high porosity (for example, greater than 30% based on pore volume) due to an amount or composition of solvent employed. Any such pores may typically be difficult to remove entirely. Indeed, in some examples, at least some porosity may be desirable, as the battery cell may operate based on porous electrode theory. For example, when the multi-layered coated electrode 101 is an anode, the multi-layered coated electrode 101 may be fabricated to have about 20-25% porosity. In one example, size morphologies of particles forming the coating layers, along with the porosity and an overall pore distribution of each of the coating layers, may be selected to improve a conductivity of the multi-layered coated electrode 101. As discussed below, by altering the compositions of the coating layers to minimize an amount of higher-density active material while balancing for electrochemical performance by substituting lower-density binders and conductive additives, the calendering density of the coating layers may be correspondingly maximized. As an example, the multi-layered coated electrode 101 may be an anode including graphite (as an active material), a binder (for instance, SBR and CMC), and a carbon-based conductive additive, whereby the binder, having a density lower than 2.0 g/cc, may decrease the calendering density of the multi-layered coated electrode 101.

After the first and second coating layers 111, 112 are coated and calendered, respective first and second thicknesses along the axis 113 may be determined. In some examples, the first thickness may be less than 100 µm. In some examples, the first thickness may be greater than 1 µm and less than 50 µm. In some examples, the first thickness may be greater than 1 µm and less than 20 µm. In some examples, the first thickness may be less than 10 µm.

In some examples, the second thickness may be less than 150 µm. In some examples, the second thickness may be greater than 10 µm and less than 100 µm. In some examples, the second thickness may be greater than 10 µm and less than 75 µm. In some examples, the second thickness may be greater than 10 µm and less than 50 µm.

In some examples, the second thickness may be greater than the first thickness. Accordingly, a ratio of the first thickness to the second thickness may be less than 1:1. In some examples, the ratio of the first thickness to the second thickness may be greater than or equal to 1:99 and less than or equal to 3:7. In additional or alternative examples, the ratio of the first thickness to the second thickness may be less than 1:9. For example, the ratio of the first thickness to the second thickness may be greater than or equal to 1:99 and less than 1:9. In some examples, the ratio of the first thickness to the second thickness may be about 1:19 or 1:9.

Relative loadings, calendering densities, and thicknesses may be selected so as to balance costs and benefits to electrochemical performance in a finally-formed battery cell. As an example, the average calendering density of the first and second coating layers 111, 112 may be selected to maximize energy density in the multi-layered coated electrode 101. Specifically, the average calendering density may be increased to a relatively high value, for example, greater than or equal to 1.7 g/cc, to correspondingly reduce the first and second thicknesses of the first and second coating layers 111, 112. By compressing the first and second coating layers 111, 112 in this way, the overall energy density may be increased by providing more of an active material and a conductive additive per unit volume of the first and second coating layers 111, 112.

As another example, the first and second loadings may be selected to minimize both DCIR in the multi-layered coated electrode 101 as well as sacrifices to adhesion between the current collector 110 and the first and second coating layers 111, 112. Specifically, the first loading of the first coating layer 111 may be less than the second loading of the second coating layer 112, while the first coating layer 111 may be formed with a higher weight ratio of a binder than the second coating layer 112. As such, the first loading may be minimized so as to employ a threshold amount of the binder to maintain adhesion of the first coating layer 111 with the current collector 110 and mitigate delamination during electrode build and soaking, and formation and cycling of the battery cell. Further, as the second coating layer 112 may not be placed in face-sharing contact with the current collector 110, the second coating layer 112 may be formed with a lower weight ratio of the binder, and the second loading may be increased so as to maximize a total amount of the active material and the conductive additive in the multi-layered coated electrode 101. In this way, a multi-layered coated electrode may be formed where adhesion may be maintained between the current collector and the coating layers by increasing the amount of the binder in the coating layer having a low loading, while DCIR may be minimized by reducing the amount of the binder in the coating layer having a higher loading.

In some examples, each of the first and second coating layers 111, 112 may include the binder. In some examples, the binder may include one or more of polystyrene-butadiene rubber (SBR), carboxymethyl cellulose (CMC), an acrylate polymer, an acrylate-SBR copolymer, an acrylate-coated SBR, and polyvinylidene fluoride (PVDF). In additional or alternative examples, the binder may include one or more of polyvinyl alcohol (PVA), starch, hydroxypropylcellulose, regenerated cellulose, polyvinylpyrrolidone (PVP), tetrafluoroethylene, polyethylene, polypropylene, ethylene propylene diene monomer rubber (EPDM), sulfonated EPDM, and a fluorine rubber.

A composition of the binder may depend on whether the multi-layered coated electrode 101 is a cathode or an anode. As a non-limiting example, when the multi-layered coated electrode 101 is an anode, the binder included in each of the first and second coating layers 111, 112 may be a water-based binder, such as a combination or blend of SBR and CMC. In such an example, the first coating layer 111 may include 1.0-2.5 wt % SBR and 0.5-1.5 wt % CMC, and the second coating layer 112 may include 0.5-2.0 wt % SBR and 0.5-1.5 wt % CMC. As another non-limiting example, when the multi-layered coated electrode 101 is a cathode, the binder included in each of the first and second coating layers 111, 112 may be a solvent-based binder (for example, the solvent may be N-methyl-2-pyrrolidone or NMP), such as PVDF. It will be appreciated, however, that solvent-based binders such as PVDF may also be employed as the binder when the multi-layered coated electrode 101 is an anode. In such an example, the first coating layer 111 may include 1-2 wt % PVDF and the second coating layer 112 may include less than 1 wt % PVDF.

In some examples, the first coating layer 111 may include a first binder and the second coating layer 112 may include a second binder, wherein the first binder may be different from the second binder. In other examples, the first and second binders may be the same. Accordingly, the first and second binders may independently include one or more of SBR, CMC, an acrylate polymer, an acrylate-SBR copolymer, an acrylate-coated SBR, and PVDF. As the first coating layer 111 may be developed for higher adhesion than the second coating layer 112, the first binder may be selected to confer higher adhesion to a first interface 131 between the current collector 110 and the first coating layer 111. For example, the first binder may have a lower glass transition temperature than the second binder, such that the first binder may be more elastic at lower temperatures than the second binder. In one example, the first binder may include on or more of an acrylate-SBR copolymer, an acrylate-coated SBR, or another combination or blend of SBR and the acrylate polymer.

The first coating layer 111 may include the first binder in a first weight ratio of the first coating layer 111 and the second coating layer 112 may include the second binder in a second weight ratio of the second coating layer 112, where the first weight ratio may be greater than the second weight ratio. In some examples, the first weight ratio may be greater than 10 wt %. In some examples, the first weight ratio may be greater than 5 wt %. In some examples, the first weight ratio may be greater than 3 wt %. In some examples, the first weight ratio may be greater than 2.8 wt %. In some examples, the second weight ratio may be less than or equal to 10 wt %. In some examples, the second weight ratio may be less than or equal to 5 wt %. In some examples, the second weight ratio may be less than or equal to 3 wt %. In some examples, the second weight ratio may be less than or equal to 2.8 wt %.

Further, a ratio of the second weight ratio to the first weight ratio may be less than 1:1. In some examples, the ratio of the second weight ratio to the first weight ratio may be greater than or equal to 1:99 and less than or equal to 1:2. In some examples, the ratio of the second weight ratio to the first weight ratio may be greater than or equal to 1:4 and less than or equal to 1:1.3. In some examples, the ratio of the second weight ratio to the first weight ratio may be less than 1:9. In some examples, the ratio of the second weight ratio to the first weight ratio may be less than 1:1.3. In some examples, the ratio of the second weight ratio to the first weight ratio may be about 1:25. In some examples, the ratio of the second weight ratio to the first weight ratio may be about 1:20. In some examples, the ratio of the second weight ratio to the first weight ratio may be about 1:10. In some examples, the ratio of the second weight ratio to the first weight ratio may be about 1:5. In some examples, the ratio of the second weight ratio to the first weight ratio may be about 1:2.

In some examples, the first coating layer 111 may include a first conductive additive and the second coating layer 112 may include a second conductive additive, wherein the first conductive additive may be different from the second conductive additive. In other examples, the first and second conductive additives may be the same. In some examples, the first and second conductive additives may independently include one or more of carbon black and carbon nanotubes (CNTs). In one example wherein the multi-layered coated electrode 101 is the positive electrode, the first conductive additive may include CNTs.

An increased DCIR ascribed to the higher weight ratio of the binder in the first coating layer 111 may be balanced by selecting the first conductive additive to reduce the DCIR with a relatively small amount. As such, in some examples, the first conductive additive may have a higher surface area than the second conductive additive. In one example, the first conductive additive may be CNTs and the second conductive additive may be carbon black. Specifically, including the CNTs in the first coating layer may provide such reduced DCIR with a relatively small amount, for example, less than 0.5 wt %. In another example, the first conductive additive may be carbon black and the second conductive additive may be CNTs. Specifically, including carbon black in the first coating layer 111 may provide increased electrical conduction between the current collector 110 and the second coating layer 112.

The first coating layer 111 may include the first conductive additive in a third weight ratio of the first coating layer 111 and the second coating layer 112 may include the second conductive additive in a fourth weight ratio of the second coating layer 112. In some examples, the third weight ratio may be less than 50 wt %. In some examples, the third weight ratio may be less than 25 wt %. In some examples, the third weight ratio may be less than 10 wt %. In some examples, the third weight ratio may be less than 5 wt %. In some examples, the third weight ratio may be less than 1.3 wt %. In some examples, the third weight ratio may be less than 1 wt %. In some examples, the third weight ratio may be less than 0.5 wt %. In some examples, the fourth weight ratio may be less than 10 wt %. In some examples, the fourth weight ratio may be less than 5 wt %. In some examples, the fourth weight ratio may be less than 1.3 wt %. In some examples, the fourth weight ratio may be less than 1 wt %. In some examples, the fourth weight ratio may be less than 0.5 wt %. In some examples, one or both of the third and fourth weight ratios, or an average weight ratio thereof, may be greater than or equal to 0.8 wt %. In some examples (for instance, if one or both of the first and second conductive additives include CNTs), one or both of the third and fourth weight ratio, or the average weight ratio thereof, may be as low as (e.g., greater than or equal to) 0.3 wt %.

In some examples, the third weight ratio may be greater than the fourth weight ratio. In additional or alternative examples, the third weight ratio may be substantially equal to the fourth weight ratio. Accordingly, a ratio of the fourth weight ratio to the third weight ratio may be less than or equal to 1:1. In some examples, the ratio of the second weight ratio to the first weight ratio may be greater than or equal to 1:99 and less than or equal to 1:2. In some examples, the ratio of the fourth weight ratio to the third weight ratio may be about 1:50. In some examples, the ratio of the fourth weight ratio to the third weight ratio may be about 1:25. In some examples, the ratio of the fourth weight ratio to the third weight ratio may be about 1:10. In some examples, the ratio of the fourth weight ratio to the third weight ratio may be about 1:5. In some examples, the ratio of the fourth weight ratio to the third weight ratio may be about 1:2. In some examples, the ratio of the fourth weight ratio to the third weight ratio may be about 1:1.

When a total amount of the binder by weight is reduced in the first and second coating layers 111, 112, a total amount of the conductive additive by weight may be proportionally increased. Accordingly, as the total amount of the conductive additive by weight increases relative to the total amount of the binder by weight, the DCIR of a finally-formed electrode may decrease approximately linearly due to the increased conductivity conferred by the increased total amount of the conductive additive by weight. In some examples, a ratio of a first total weight ratio of the first and second conductive additives to a second total weight ratio of the first and second binders may be greater than or equal to 21%. In some examples, the ratio of the first total weight ratio to the second total weight ratio may be greater than or equal to 22%. In some examples, the ratio of the first total weight ratio to the second total weight ratio may be greater than or equal to 24%. In some examples, the ratio of the first total weight ratio to the second total weight ratio may be greater than or equal to 26%. In some examples, the ratio of the first total weight ratio to the second total weight ratio may be greater than or equal to 28%. In some examples, the ratio of the first total weight ratio to the second total weight ratio may be greater than or equal to 30%.

In some examples, a ratio of the fourth weight ratio (of the second conductive additive) to the second weight ratio (of the second binder) may be greater than or equal to 27%. In some examples, the ratio of the fourth weight ratio to the second weight ratio may be greater than or equal to 29%. In some examples, the ratio of the fourth weight ratio to the second weight ratio may be greater than or equal to 31%. In some examples, the ratio of the fourth weight ratio to the second weight ratio may be greater than or equal to 33%. In some examples, the ratio of the fourth weight ratio to the second weight ratio may be greater than or equal to 35%. In some examples, a ratio of the third weight ratio (of the first conductive additive) to the first weight ratio (of the first binder) may be greater than or equal to 21%. In some examples, the ratio of the third weight ratio to the first weight ratio may be greater than or equal to 22%. In some examples, the ratio of the third weight ratio to the first weight ratio may be greater than or equal to 23%. In some examples, the ratio of the third weight ratio to the first weight ratio may be greater than or equal to 24%. In some examples, the ratio of the third weight ratio to the first weight ratio may be greater than or equal to 25%.

In some examples, one or both of the first and second coating layers 111, 112 may include the active material. In some examples, the active material may be an electrochemically active material which may reversibly intercalate and de-intercalate lithium ions. A composition of the active material may depend on whether the multi-layered coated electrode 101 is a cathode or an anode. In examples wherein the multi-layered coated electrode 101 is an anode, the active material may include graphite. In examples wherein the multi-layered coated electrode 101 is a cathode, the active material may include one or more of lithium nickel cobalt manganese oxide (NCM or NMC), a lithium iron phosphate (LFP), a lithium nickel cobalt aluminum oxide (NCA), a lithium cobalt oxide (NCO), a lithium manganese nickel oxide (LMN), a lithium manganese oxide (LMO), a lithium cobalt phosphate (LCP), a lithium nickel phosphate (LNP), and a lithium manganese phosphate (LMP).

In some examples, the first coating layer 111 may include a first active material and the second coating layer 112 may include a second active material, wherein the first active material may be different from the second active material. In other examples, the first and second active materials may be the same. Accordingly, the first and second active materials may independently include one or more of graphite, NCM, LFP, NCA, NCO, LMN, LMO, LCP, LNP, and LMP. As one example, the first active material may be a first form of graphite (e.g., synthetic graphite) and the second active material may be a second form of graphite (e.g., natural graphite). As another example, the first active material may be a first NCM having a first nickel stoichiometric content of 70-95% relative to a first total nickel, cobalt, and manganese stoichiometric content of the first NCM, and the second active material may be a second NCM having a second nickel stoichiometric content of 50-80% relative to a second total nickel, cobalt, and manganese stoichiometric content of the second NCM. In such an example, the active material may have a general formula of $Li_aNi_xCo_yMn_{1-x-y}O_2$. In additional or alternative examples, the general formula may be lithium-rich, so that a>1, or stoichiometric, so that a=1.

In examples where the first and second active materials are different, each of the first and second active materials may be selected to confer different performance or safety properties to the battery cell including the multi-layered coated electrode 101. In some examples, such as when the multi-layered coated electrode 101 is a cathode, the first active material may be a thermally protective material, such as LFP or LMO, and the second active material may be a high energy density material, such as an NCM having a high nickel content. In some examples, should a short circuit condition arise, the thermally protective material in the first coating layer 111 may retard thermal runaway, while the high energy density material in the second coating layer may maintain electrochemical performance. As one example, the first active material may be LFP and the second active material may be NCM. As yet another example, the first active material may be LFP and the second active material may be NCA. As yet another example, the first active material may be LMO and the second active material may be NCM. As yet another example, the first active material may be LMO and the second active material may be NCA.

The first coating layer 111 may include the first active material in a fifth weight ratio of the first coating layer 111 and the second coating layer 112 may include the second active material in a sixth weight ratio of the second coating layer 112. In some examples, the sixth weight ratio may be greater than the fifth weight ratio. In additional or alternative examples, the fifth weight ratio may be substantially equal to the sixth weight ratio. Accordingly, a ratio of the fifth weight ratio to the sixth weight ratio may be less than or equal to 1:1. In some examples, the fifth and sixth weight ratios may independently be greater than 85 wt %. In some examples, the fifth and sixth weight ratios may independently be greater than 90 wt %. In some examples, the fifth and sixth weight ratios may independently be greater than 95 wt %.

The first and second active materials may be respectively included in the first and second coating layers 111, 112 in the form of particles. For example, the particles may be secondary particles composed of a plurality of primary particles. In some examples, the particles may have a particle size characterized by a D50 value. In some examples, the D50 value of the particles in the first coating layer 111 may be less than or equal to 10 μm. In some examples, the D50 value of the particles in the first coating layer 111 may be less than or equal to 9 μm. In some examples, the D50 value of the particles in the first coating layer 111 may be less than or equal to 8 μm. In some examples, the D50 value of the particles in the first coating layer 111 may be less than or equal to 7 μm. In some examples, the D50 value of the particles in the first coating layer 111 may be less than or equal to 6 μm. In some examples, the D50 value of the particles in the first coating layer 111 may be less than or equal to 5 μm. In one example, the D50 value of the particles in the first coating layer 111 may be greater than or equal to 1 μm and less than or equal to 10 μm. In some examples, the D50 value of the particles in the second coating layer 112 may be less than or equal to 20 μm. In some examples, the D50 value of the particles in the second coating layer 112 may be less than or equal to 15 μm. In some examples, the D50 value of the particles in the second coating layer 112 may be less than or equal to 10 μm. In some examples, the D50 value of the particles in the second coating layer 112 may be less than or equal to 9 μm. In some examples, the D50 value of the particles in the second coating layer 112 may be less than or equal to 8 μm. In some examples, the D50 value of the particles in the second coating layer 112 may be less than or equal to 7 μm. In some examples, the D50 value of the particles in the second coating layer 112 may be less than or equal to 6 μm. In some examples, the D50 value of the particles in the second coating layer 112 may be less than or equal to 5 μm. In one example, the D50 value of the particles in the second coating layer 112 may be greater than or equal to 5 μm and less than or equal to 20 μm. It will be appreciated that the D50 values of the particles in the first and second coating layers 111, 112 may vary depending on desired energy and power, or whether the multi-layered coated electrode 101 is a cathode or an anode.

In some examples, such as in high-energy applications, the D50 value of the particles of the first active material may be lower than the D50 value of the particles of the second active material. In other examples, such as in high-power applications, the D50 value of the particles of the first active material may be greater than the D50 value of the particles of the second active material. In one example, the D50 value of particles of an active material included in a thicker coating layer of the first and second coating layers 111, 112 may be lower (e.g., 5 to 99.5% lower) than particles of an active material included in a thinner coating layer of the first and second coating layers 111, 112, the thicker coating layer having a thickness measured along the axis 113 greater than a thickness measured along the axis 113 of the thinner coating layer. In additional or alternative examples, and as discussed in detail below with reference to FIGS. 2 and 3, the particle size of one or both of the first and second active materials may be characterized by a bimodal PSD.

Relatively large particle sizes, for example, greater than 10 μm, may be desirable to increase a higher calendering density of the first coating layer 111, concomitantly increasing an energy density. Further, relatively small particle sizes, for example, less than or equal to 10 μm, may be desirable to reduce the first thickness of the first coating layer 111. As such, the power of the multi-layered coated electrode 101 may be correspondingly increased, and an impedance and the DCIR of the multi-layered coated electrode 101 may be correspondingly decreased. In other examples, it may be desirable to include relatively small sized particles (e.g., less than or equal to 10 μm) even when the first thickness of the first coating layer 111 is relatively high. In other examples, it may be desirable to include relatively large sized particles (e.g., greater than 10 μm) even when the first thickness of the first coating layer 111 is relatively low.

In some examples, to maximize each of the amount of the binder by weight and the amount of the conductive additive by weight in the first coating layer 111, the first coating layer 111 may include no, or substantially no, active material. Accordingly, absent the active material, the first thickness of the first coating layer 111 may be minimized further. In this way, adhesion and electrical conductivity may be maximized in a thinner coating layer disposed directly on a current collector in a multi-layered coated electrode, where the thinner coating layer may include no active material, and a thicker coating layer may further be disposed on the thinner coating layer, where the thicker coating layer may include a relatively high amount of an active material by weight.

Each of the binder, the conductive additive, and the active material may be present in one or both of the first and second coating layers 111, 112 in the form of particulates. In some examples, the particulates may be characterized by a PSD, such as a normal PSD, a bimodal PSD, a trimodal PSD, a multimodal PSD, an exponential PSD, etc. In one example, and as described below in detail with reference to FIGS. 2 and 3, the particulates may have a bimodal PSD, wherein the particulates may include a group of smaller particulates and a group of larger particulates, each of the larger particulates being larger in particulate size than the smaller particulates. In such an example, the bimodal PSD may include substantially only two modes (e.g., respectively corresponding to the group of smaller particulates and the group of larger particulates, where the two modes account for >95% of the particulates by number, volume density, or weight). In this way, smaller particulates may substantially fill gaps between larger particulates in coating layers of a multi-layered coated electrode, thereby increasing an overall electrode density. In other examples, the particulates may have a trimodal PSD, wherein the particulates may include a group of smaller particulates, a group of intermediate particulates, and a group of larger particulates, each of the larger particulates being larger in particulate size than the intermediate and smaller particulates, and each of the intermediate particulates being larger in particulate size than the smaller particulates. In such an example, the trimodal PSD may include substantially only three modes (e.g., respectively corresponding to the group of smaller particulates, the group of intermediate particulates, and the group of larger particulates, where the three modes account for >95% of the particulates by number, volume density, or weight).

In some examples, more than two coating layers may be disposed on the current collector 110. For example, a third coating layer (not shown) may be disposed on the second coating layer 112, such that the second coating layer 112 is interposed between the first coating layer 111 and the current collector 110. Accordingly, it will be appreciated that the properties, compositions, and structural configurations described herein with reference to the first and second coating layers 111, 112 may be applied to the third coating layer or to any further coating layers within the scope of the present disclosure. As an example, the third coating layer may be disposed on the second coating layer 112 at a loading less than the second loading of the second coating layer 112 on the first coating layer 111. As another example, the third coating layer may include the binder at a weight ratio less than the second weight ratio of the binder included in the second coating layer 112. In this way, a multi-layered coated electrode may be configured with a composition gradient structure, which may reduce abrupt changes in electrical and ionic conduction, thereby increasing an electrochemical performance of a battery cell including the multi-layered coated electrode. However, it will be appreciated that such considerations as to increased electrochemical performance may be balanced by a total processing time as dependent upon a total number of coating layers employed (for example, a multi-layered coated electrode including two coating layers may provide less total processing time, whereas a multi-layered coated electrode including three coating layers may provide a smoother composition gradient).

As shown, the first interface 131 may be formed directly between the current collector 110 and the first coating layer 111, and a second interface 132 may be formed directly between the first coating layer 111 and the second coating layer 112. As discussed herein, adhesion at the first interface 131 may be increased by an increased amount of the binder by weight in the first coating layer 111.

In some examples, an intermixed interfacial region may be formed between the first and second coating layers during coating, where the intermixed interfacial region may include a portion of each of the first and second coating layers. In one example, the intermixed interfacial region may result from a "wet-on-wet" coating technique, wherein the first coating layer and the second coating layer may be respectively disposed onto the current collector and the first coating layer prior to drying of either coating layer. For example, adhesion at the second interface 132 may be increased by simultaneously coating the first and second coating layers 111, 112 prior to drying, such that at least a portion of each of the first and second coating layers 111, 112 may be intermixed.

The first and second coating layers may be simultaneously coated on the current collector via a "wet-on-wet" coating technique (such as via the method and slot die configurations therefor described below with reference to FIGS. 7 and 8, respectively), wherein the first coating layer and the second coating layer may be respectively disposed onto the current collector and the first coating layer prior to drying of either coating layer. In some examples, an interfacial region may be formed, where the interfacial region may overlap with each of the first and second coating layers. Specifically, the interfacial region may include a portion of the first coating layer intermixed with a portion of the second coating layer, where remaining portions of the first and second coating layers may not be mixed with one another.

In some examples, the interfacial region may include a plurality of first pores or bubbles in the first coating layer and a plurality of second pores or bubbles in the second coating layer. Specifically, the first and second pores may be present during a coating process of the first and second coating layers. In some examples, following drying and calendering, at least some of the first and second pores may remain in the multi-layered coated electrode as formed. In other examples, the first and second pores may not form during the coating process.

In some examples, at least a portion of each of the first and second coating layers may respectively permeate into the second and first pores. In one example, the second and first pores may be respectively formed by the permeating of the first and second coating layers. Accordingly, the interfacial region may have a permeation length into each of the first and second coating layers. Further, a permeation length fraction may be defined for the interfacial region as the permeation length of the interfacial region divided by a total length of a corresponding coating layer, wherein each of the permeation length and the total length may be parallel to an axis parallel to the thickness of the corresponding coating layer (for example, the axis 113 of FIG. 1). In one example, the permeation length may refer to a maximum extent of the interfacial region into the corresponding coating layer. In an additional or alternative example, the total length of the corresponding coating layer may refer to a maximum thickness of the corresponding coating layer along an axis (for example, the axis 113 of FIG. 1). In some examples, the interfacial region may respectively extend into the first and second coating layers by a permeation length fraction of less than or equal to 50%. In some examples, the permeation length fraction may be less than or equal to 40%. In some examples, the permeation length fraction may be less than or equal to 30%. In some examples, the permeation length fraction may be less than or equal to 25%. In some examples, the permeation length fraction may be less than or equal to 20%. In some examples, the permeation length fraction may be less than or equal to 15%. In some examples, the permeation length fraction may be less than or equal to 10%. In some examples, the permeation length fraction may be less than or equal to 5%.

Referring now to FIG. 2, a cross-sectional view 200 illustrating a coating layer of a multi-layered coated electrode is shown. In some examples, the coating layer may be the first coating layer 111 or the second coating layer 112 of FIG. 1. Accordingly, in some examples, the coating layer may be coated on a current collector or another coating layer to form the multi-layered coated electrode for use in a lithium-ion battery cell.

The coating layer may be formed by depositing a slurry on an electrode structure, such as the current collector or another coating layer, where the slurry may include a plurality of particles dispersed in a liquid or semi-solid medium, such as a solvent, polymer, etc. In some examples, the plurality of particles may include one or more of active material particles 201, binder particles 202, and conductive additive particles 203. Further, a plurality of gaps or spaces 204 may be disposed within the plurality of particles, where no particulate material may be present.

The plurality of particles may further be characterized by a bimodal PSD. Specifically, the plurality of particles may include a plurality of smaller particles and a plurality of larger particles, where each of the plurality of larger particles may be larger in size than each of the plurality of smaller particles. The active material particles 201 may similarly be characterized by a bimodal PSD. Specifically, the active material particles 201 may include smaller active material particles 201a and larger active material particles 201b, where each of the larger active material particles 201b may be larger in size (e.g., D50 size) than each of the smaller active material particles 201a. In one example, and as shown in the cross-sectional view 200, the plurality of larger particles may include the larger active material particles 201b and the plurality of smaller particles may include the smaller active material particles 201a, the binder particles 202, and the conductive additive particles 203.

Though the plurality of particles are depicted in the cross-sectional view 200 as being substantially round (that is, spherical), it will be appreciated that the plurality of particles may be configured as one or more three-dimensional shapes, such as ellipsoids, rods, plates, flakes, tubes, etc. or as shapes which are asymmetrical in multiple spatial dimensions. In some examples, particles in one layer of the multi-layered coated electrode may differ in shape from particles in another layer of the multi-layered coated electrode. For instance, a first layer of the multi-layered coated electrode may include particles formed from a first active material and having a first shape (e.g., flakes or plates) and a second layer of the multi-layered coated electrode may include particles formed from a second active material and having a second shape (e.g., spherical or ellipsoid particles). In some examples, at least some of the plurality of particles may be configured as composite particles formed from pluralities of component particles. For instance, the active material particles 201 may be in the form of secondary particles and primary particles, wherein the larger, secondary particles may be composed of the smaller, primary particles.

In some examples, the coating layer having the bimodal PSD may confer a higher electrode density to the multi-layered coated electrode. Specifically, due to fundamental geometrical considerations, the plurality of larger particles may leave the plurality of gaps 204 therebetween. Without wishing to be bound by theory, the plurality of larger particles may be substantially spherical and substantially equal in particle size, such that even compressed packing of the plurality of larger particles may leave some space unfilled. As proven by Gauss, the highest average density which may be achieved by a lattice packing of equally-sized spheres is $\pi/(3*2^{1/2})$, or about 0.74048. Accordingly, the plurality of smaller particles may be provided to fill in spaces left vacant by the plurality of larger particles. In this way, by forming a coating layer from a plurality of particles having a bimodal PSD, an electrode density of a formed electrode may be increased, which may correspondingly increase an energy density thereof, and thereby electrochemical performance of a battery cell including the electrode.

In some examples, as a thickness of a given coating layer of the multi-layered coated electrode increases, a desirable D50 size of the active material particles 201 included therein may decrease. Correspondingly, as the thickness of the given coating layer of the multi-layered coated electrode decreases, the desirable D50 size of the active material particles 201 included therein may increase. For example, the multi-layered coated electrode may include first and second coating layers, each of the first and second coating layers including the active material particles 201, where the smaller active material particles 201a may be included in a thicker coating layer of the first and second coating layers and the larger active material particles 201b may be included in a thinner coating layer of the first and second coating layers. In one example, a D50 size of the smaller active material particles 201a included in the thicker coating layer of the first and second coating layers may be 5 to 99.5% of a D50 size of the larger active material particles in the thinner coating layer of the first and second coating layers. In some examples, which of the first and second coating layers is the thinner coating layer including the larger active material particles 201b and which of the first and second coating layers is the thicker coating layer including the smaller active material particles 201a may be dependent on an application of the lithium-ion battery cell (e.g., whether the lithium-ion battery cell is configured primarily for relatively high power or relatively high energy density).

Referring now to FIG. 3, a plot 300 illustrating an exemplary PSD 301 of a plurality of particles is shown. The plurality of particles may be included in a coating layer of a multi-layered coated electrode, as described above with reference to FIG. 2. As such, the multi-layered coated electrode may be the multi-layered coated electrode 101 of FIG. 1.

As shown, volume density as a percent value is represented by an ordinate, and particle size in microns (μm) is represented by an abscissa. It will be appreciated that the particle size represented by the abscissa may correspond to any one of a number of metrics, such as average particle diameter, particle diameter along a smallest axis, particle diameter along a largest axis, D50 size, etc. As further shown, the PSD 301 is plotted as a bimodal PSD, in that the PSD 301 may be characterized by a first peak or mode 302 and a second peak or mode 303. In certain examples, the PSD 301 may include substantially only two modes, the first and second modes 302, 303, respectively corresponding to a plurality of smaller particles and a plurality of larger particles. In some examples, the first peak 302 may correspond to a first particle size of less than or equal to 10 μm and the second peak 303 may correspond to a second particle size of less than or equal to 20 μm. In one example, the multi-layered coated electrode may be an anode, wherein the first peak 302 may be about 5 μm and the second peak 303 may be about 17 μm. Accordingly, the first peak 302 may correspond to a portion of the plurality of particles having a relatively small size and the second peak 303 may correspond to a portion of the plurality of particles having a relatively large size.

A slurry may be prepared including the plurality of particles having the (bimodal) PSD 301. Once the slurry is coated and dried onto a current collector, the plurality of particles may be calendered at a predetermined calendering density to form the coating layer on the current collector, whereby the plurality of particles may be packed more closely together. In this way, a density of a coating layer for an electrode may be increased by close packing of particles therein.

Referring now to Tables 1-3 below, various specifications are provided for exemplary coated electrodes TL0-1, TL0-2, TL0-3, TL1-1, TL1-2, TL1-5, TL1-6, and TL1-7. Specifically, the exemplary coated electrodes TL0-1, TL0-3, and TL1-1 are single-layered coated electrodes which may be utilized for determining control or reference values, and the exemplary coated electrodes TL0-2, TL1-2, TL1-5, TL1-6, and TL1-7 are multi-layered coated electrodes. When described with reference to the exemplary coated electrodes TL0-2, TL1-2, TL1-5, TL1-6, and TL1-7, a "first coating layer" may refer to a coating layer disposed directly on a current collector and a "second coating layer" may refer to a coating layer disposed on the first coating layer, such that the first coating layer may be interposed between the current collector and the second coating layer. It will further be appreciated that the coated electrodes TL0-1, TL0-2, TL0-3, TL1-1, TL1-2, TL1-5, TL1-6, and TL1-7 are exemplary and not to be interpreted as limiting examples of the present disclosure. Accordingly, in some examples, the exemplary coated electrodes TL0-2, TL1-2, TL1-5, TL1-6, and TL1-7 may be exemplary embodiments of the multi-layered coated electrode 101 described above with reference to FIG. 1.

TABLE 1

Specifications for exemplary coated electrodes TL0-1, TL0-2, and TL0-3. Coating weights and calendering thicknesses presented in Table 1 are inclusive of both sides of the current collector.

| | Identifier | | | |
|---|---|---|---|---|
| | TL0-1 | TL0-2 | | TL0-3 |
| | Layer | | | |
| | Single coating layer | First coating layer | Second coating layer | Single coating layer |
| Active material, amount by weight (wt %) | Graphite, 95.6 | Graphite, 95.6 | Graphite, 96.4 | Graphite, 96.4 |
| Conductive additive, amount by weight (wt %) | SUPER C65 carbon black, 0.8 | SUPER C65 carbon black, 0.8 | SUPER C65 carbon black, 0.8 | SUPER C65 carbon black, 0.8 |
| Binder, amount by weight (wt %) | CMC, 1.3; SBR, 2.3 | CMC, 1.3; SBR, 2.3 | CMC, 1.0; SBR, 1.8 | CMC, 1.0; SBR, 1.8 |
| Ratio of conductive additive to binder (%) | 22.2 | 22.2 | 28.6 | 28.6 |
| Current collector (copper foil) thickness (μm) | 10 | 10 | | 10 |
| Total coating weight (g/m²) | 273.0 | 271.2 | | 270.7 |
| Coating weight per layer (g/m²) | 273.0 | 54.6 | 216.6 | 270.7 |
| Total amount of active material (g/m²) | 261.0 | 261.0 | | 261.0 |
| Amount of active material per layer (g/m²) | 261.0 | 52.2 | 208.8 | 261.0 |
| Average calendering density (g/cc) | 1.7 | 1.7 | | 1.7 |
| Total calendering thickness (μm) | 170.6 | 169.5 | | 169.3 |

TABLE 2

Specifications for exemplary coated electrodes TL1-1, TL1-2, and TL1-5.
Coating weights and calendering thicknesses presented in Table 2 are inclusive of only one side of the current collector.

| | Identifier | | | | |
|---|---|---|---|---|---|
| | TL1-1 | TL1-2 | | TL1-5 | |
| | Layer | | | | |
| | Single coating layer | First coating layer | Second coating layer | First coating layer | Second coating layer |
| Active material, amount by weight (wt %) | Graphite, 95.6 | Graphite, 95.6 | Graphite, 96.4 | Graphite, 95.6 | Graphite, 96.4 |
| Conductive additive, amount by weight (wt %) | SUPER C65 carbon black, 0.8 | SUPER C65 carbon black, 0.8 | SUPER C65 carbon black, 0.8 | SUPER C65 carbon black, 0.8 | SUPER C65 carbon black, 0.8 |
| Binder, amount by weight (wt %) | CMC, 1.3; SBR, 2.3 | CMC, 1.3; SBR, 2.3 | CMC, 1.0; SBR, 1.8 | CMC, 1.3; SBR, 2.3 | CMC, 1.0; SBR, 1.8 |
| Ratio of conductive additive to binder (%) | 22.2 | 27.8 | | 28.0 | |
| Ratio of conductive additive to binder per layer (%) | 22.2 | 22.2 | 28.6 | 22.2 | 28.6 |
| Current collector (copper foil) thickness (μm) | 10 | 10 | | 10 | |
| Total coating weight (g/m$^2$) | 138.8 | 137.8 | | 137.7 | |
| Coating weight per layer (g/m$^2$) | 138.8 | 13.9 | 123.9 | 9.7 | 128.0 |
| Total amount of active material (g/m$^2$) | 132.7 | 132.7 | | 132.7 | |
| Amount of active material per layer (g/m$^2$) | 132.7 | 13.3 | 119.4 | 9.3 | 123.4 |
| Average calendering density (g/cc) | 1.65 | 1.65 | | 1.65 | |
| Total calendering thickness (μm) | 94.1 | 93.5 | | 93.5 | |

Table 3: Specifications for exemplary coated electrodes TL1-6 and TL1-7. Coating weights and calendering thicknesses presented in Table 3 are inclusive of only one side of the current collector.

TABLE 3

Specifications for exemplary coated electrodes TL1-6 and TL1-7.
Coating weights and calendering thicknesses presented in Table 3 are inclusive of only one side of the current collector.

| | Identifier | | | |
|---|---|---|---|---|
| | TL1-6 | | TL1-7 | |
| | Layer | | | |
| | First coating layer | Second coating layer | First coating layer | Second coating layer |
| Active material, amount by weight (wt %) | Graphite, 95.6 | Graphite, 97.0 | 0 | Graphite, 97.0 |
| Conductive additive, amount by weight (wt %) | SUPER C65 carbon black, 0.8 | SUPER C65 carbon black, 0.8 | SUPER C65 carbon black, 49.10 | SUPER C65 carbon black, 0.8 |
| Binder, amount by weight (wt %) | CMC, 1.3; SBR, 2.3 | CMC, 1.0; SBR, 1.2 | CMC, 18.4; SBR, 32.5 | CMC, 1.0; SBR, 1.2 |
| Ratio of conductive additive to binder (%) | 34.8 | | 63.3 | |
| Ratio of conductive additive to binder per layer (%) | 22.2 | 36.4 | 96.5 | 36.4 |

TABLE 3-continued

Specifications for exemplary coated electrodes TL1-6 and TL1-7. Coating weights and calendering thicknesses presented in Table 3 are inclusive of only one side of the current collector.

| | Identifier | | | |
|---|---|---|---|---|
| | TL1-6 | | TL1-7 | |
| | Layer | | | |
| | First coating layer | Second coating layer | First coating layer | Second coating layer |
| Current collector (copper foil) thickness (μm) | 10 | | 10 | |
| Total coating weight (g/m²) | 136.9 | | 141.6 | |
| Coating weight per layer (g/m²) | 9.7 | 127.2 | 4.8 | 136.8 |
| Total amount of active material (g/m²) | 132.7 | | 132.7 | |
| Amount of active material per layer (g/m²) | 9.3 | 123.4 | 0 | 132.7 |
| Average calendering density (g/cc) | 1.65 | | 1.65 | |
| Total calendering thickness (μm) | 93.0 | | 95.8 | |

Referring now to Table 4, various performance metrics are presented for the exemplary coated electrodes TL0-1, TL0-2, and TL0-3. As indicated above at Tables 1-3, the exemplary coated electrodes TL0-1 and TL0-3 are single-layered coated electrodes which may provide control or reference values. Specifically, the exemplary coated electrode TL0-1 may include a relative high weight ratio of CMC and SBR binders in the single coating layer therein (3.6 wt % total) and the exemplary coated electrode TL0-3 may include a relatively low weight ratio of CMC and SBR binders in the single coating layer therein (2.8 wt % total). As further indicated above at Tables 1-3, the exemplary coated electrode TL0-2 is a multi-layered coated electrode. Specifically, the exemplary coated electrode TL0-2 may include the relatively high weight ratio of CMC and SBR binders in the first coating layer therein (3.6 wt %) and the relatively low weight ratio of CMC and SBR binders in the second coating layer therein (2.8 wt %).

TABLE 4

Performance metrics for the exemplary coated electrodes TL0-1, TL0-2, and TL0-3.

| Identifier | TL0-1 | TL0-2 | TL0-3 |
|---|---|---|---|
| Thickness (μm) | 181.9 | 185.2 | 183.5 |
| Resistivity (Ω · cm) | 1.4 | 1.0 | 0.6 |
| Delamination during hot-soaking test | No | No | Yes |
| Electrical resistance (mΩ) | 12.6 | 9.7 | 6.0 |
| Discharge DCIR (Ω) | 1.723 | 1.572 | — |
| Charge DCIR (Ω) | 1.778 | 1.619 | — |

As indicated above at Table 4, a thickness of each of the exemplary coated electrodes TL0-1, TL0-2, and TL0-3 is relatively similar for ease for comparability therebetween. It should be noted that the calendering thicknesses presented in Tables 1-3 are measured within one minute following calendering, whereas the thicknesses presented in Table 4 are measured after a longer duration following calendering, once the thickness of the each given exemplary coated electrode has stabilized.

As shown, when the high weight ratio of CMC and SBR binders is employed throughout (as in the exemplary coated electrode TL0-1), a resistivity of a given coated electrode may be correspondingly high, and when the low weight ratio of CMC and SBR binders is employed throughout (as in the exemplary coated electrode TL0-3), a resistivity of a given coated electrode may be correspondingly low. However, when a dual-layered configuration is employed (as in the exemplary coated electrode TL0-2), wherein the high weight ratio of the CMC and SBR binders is employed in a coating layer nearer to the current collector at a lower loading and the low weight ratio of the CMC and SBR binders is employed in a coating layer farther from the current collector at a higher loading, a resistivity of a corresponding electrode may be in between the high and low weight ratio examples. In some examples, a resistivity of a coated electrode having the dual-layered configuration (such as the exemplary coated electrode TL0-2) may be about 20% less than a resistivity of a coated electrode having the low weight ratio of CMC and SBR binders throughout (such as the exemplary coated electrode TL0-1). In some examples, the resistivity of the coated electrode having the dual-layered configuration may be about 25% less than the resistivity of the coated electrode having the low weight ratio of CMC and SBR binders throughout. In some examples, the resistivity of the coated electrode having the dual-layered configuration may be about 30% less than the resistivity of the coated electrode having the low weight ratio of CMC and SBR binders throughout. In some examples, the resistivity of the coated electrode having the dual-layered configuration may be about 35% less than the resistivity of the coated electrode having the low weight ratio of CMC and SBR binders throughout.

Further, when the high weight ratio of the CMC and SBR binders is included in a coating layer disposed directly on the current collector (as in the exemplary coated electrodes TL0-1 and TL0-2), an adhesion therebetween may be correspondingly increased. As such, the exemplary coated electrodes TL0-1 and TL0-2 may have a relatively high adhesion between the coating layer(s) and the current collector and the TL0-3 may have a relatively low adhesion between the coating layers and the current collector. Accordingly, when each of the exemplary coated electrodes TL0-1, TL0-2, and TL0-3 are subjected to a hot-soaking test, no delamination may occur for the exemplary coated electrodes TL0-1 and TL0-2 having the relatively high adhesion, whereas delamination may occur at a stamped edge of the exemplary coated electrode TL0-3 having the relatively low adhesion. In this way, a multi-layered coated electrode may be formed which balances a resistivity (along with an electrical resistance, a discharge DCIR, a charge DCIR, and a capacity retention, as described in detail below with reference to FIGS. 4-6) and an adhesion thereof with a gradient-based configuration of binder amounts by weight in coating layers included therein.

Referring now to FIG. 4, a plot 400 illustrating an electrical resistance (through-resistance) of each of three exemplary coated electrodes is shown, where the three exemplary coated electrodes are the exemplary coated electrodes TL0-1, TL0-2, and TL0-3 described above. Accordingly, the electrical resistance of each of the exemplary coated electrodes TL0-1, TL0-2, and TL0-3 may be 12.6, 9.7, and 6.0 mΩ, respectively (as provided in Table 4). The electrical resistance of each of the exemplary coated electrodes TL0-1, TL0-2, and TL0-3 is further depicted in the plot 400 by bars 401, 402, and 403, respectively. As such, the electrical resistance is represented by an ordinate (in mΩ). It will be appreciated that, as used with reference to Table 4 and FIG. 4, "electrical resistance" or "through-resistance" may refer to an electrical resistance of a given coated electrode from one side to another, opposite side in a dry state.

As indicated by the bar 401, when the high weight ratio of CMC and SBR binders is employed throughout (as in the exemplary coated electrode TL0-1), an electrical resistance of a given coated electrode may be correspondingly high. As further indicated by the bar 403, when the low weight ratio of CMC and SBR binders is employed throughout (as in the exemplary coated electrode TL0-3), an electrical resistance of a given coated electrode may be correspondingly low. However, and as indicated by the bar 402, when a dual-layered configuration is employed (as in the exemplary coated electrode TL0-2), wherein the high weight ratio of the CMC and SBR binders is employed in a coating layer nearer to a current collector at a lower loading and the low weight ratio of the CMC and SBR binders is employed in a coating layer farther from the current collector at a higher loading, an electrical resistance of a corresponding electrode may be in between the high and low weight ratio examples. In some examples, an electrical resistance of a coated electrode having the dual-layered configuration (such as the exemplary coated electrode TL0-2) may be about 20% less than an electrical resistance of a coated electrode having the low weight ratio of CMC and SBR binders throughout (such as the exemplary coated electrode TL0-1). In some examples, the electrical resistance of the coated electrode having the dual-layered configuration may be about 25% less than the electrical resistance of the coated electrode having the low weight ratio of CMC and SBR binders throughout. In some examples, the electrical resistance of the coated electrode having the dual-layered configuration may be about 30% less than the electrical resistance of the coated electrode having the low weight ratio of CMC and SBR binders throughout. In some examples, the electrical resistance of the coated electrode having the dual-layered configuration may be about 35% less than the electrical resistance of the coated electrode having the low weight ratio of CMC and SBR binders throughout.

Referring now to FIG. 5, a plot 500 illustrating discharge and charge DCIRs of each of two exemplary coated electrodes is shown, where the two exemplary coated electrodes are the exemplary coated electrodes TL0-1 and TL0-2 described above. Accordingly, the discharge DCIR of each of the exemplary coated electrodes TL0-1 and TL0-2 may be 1.723 and 1.572Ω, respectively (as provided in Table 4), and the charge DCIR of each of the exemplary coated electrodes TL0-1 and TL0-2 may be 1.778 and 1.619Ω, respectively (as provided in Table 4). The discharge DCIR of each of the exemplary coated electrodes TL0-1 and TL0-2 is further depicted in the plot 500 by bars 501 and 502, respectively, and the charge DCIR of each of the exemplary coated electrodes TL0-1 and TL0-2 is further depicted in the plot 500 by bars 511 and 512, respectively. As such, each of the discharge and charge DCIRs is represented by an ordinate (in Ω). The discharge and charge DCIRs were collected via hybrid pulse power characterization (HPPC) tests, where the discharge and charge DCIRs were measured after 10 seconds, at 50% state of charge (of battery cells respectively including the two exemplary coated electrodes), and at 25° C.

As respectively indicated by the bars 501 and 511, when the high weight ratio of CMC and SBR binders is employed throughout (as in the exemplary coated electrode TL0-1), each of a discharge and charge DCIR of a given coated electrode may be correspondingly high. However, and as respectively indicated by the bars 502 and 512, when a dual-layered configuration is employed (as in the exemplary coated electrode TL0-2), wherein the high weight ratio of the CMC and SBR binders is employed in a coating layer nearer to a current collector at a lower loading and the low weight ratio of the CMC and SBR binders is employed in a coating layer farther from the current collector at a higher loading, each of a discharge and charge DCIR of a corresponding electrode may be lower than the high weight ratio example. In some examples, a discharge DCIR of a coated electrode having the dual-layered configuration (such as the exemplary coated electrode TL0-2) may be about 6% less than a discharge DCIR of a coated electrode having the low weight ratio of CMC and SBR binders throughout (such as the exemplary coated electrode TL0-1). In some examples, the discharge DCIR of the coated electrode having the dual-layered configuration may be about 7% less than the discharge DCIR of the coated electrode having the low weight ratio of CMC and SBR binders throughout. In some examples, the discharge DCIR of the coated electrode having the dual-layered configuration may be about 8% less than the discharge DCIR of the coated electrode having the low weight ratio of CMC and SBR binders throughout. In some examples, the discharge DCIR of the coated electrode having the dual-layered configuration may be about 9% less than the discharge DCIR of the coated electrode having the low weight ratio of CMC and SBR binders throughout. In some examples, the discharge DCIR of the coated electrode having the dual-layered configuration may be about 10% less than the discharge DCIR of the coated electrode having the low weight ratio of CMC and SBR binders throughout. In some examples, a charge DCIR of a coated electrode having the dual-layered configuration (such as the exemplary coated electrode TL0-2) may be about 6% less than a charge DCIR of a coated electrode having the low weight ratio of CMC and SBR binders throughout (such as the exemplary coated electrode TL0-1). In some examples, the charge DCIR of the coated electrode having the dual-layered configuration may be about 7% less than the charge DCIR of the coated electrode having the low weight ratio of CMC and SBR binders throughout. In some examples, the charge DCIR of the coated electrode having the dual-layered configuration may be about 8% less than the charge DCIR of the coated electrode having the low weight ratio of CMC and SBR binders throughout. In some examples, the charge DCIR of the coated electrode having the dual-layered configuration may be about 9% less than the charge DCIR of the coated electrode having the low weight ratio of CMC and SBR binders throughout. In some examples, the charge DCIR of the coated electrode having the dual-layered configuration may be about 10% less than the charge DCIR of the coated electrode having the low weight ratio of CMC and SBR binders throughout.

In the dual-layered configuration, configuring the coating layer nearer to the current collector of the coated electrode with the lower weight ratio of the CMC and SBR binders may contribute to reducing the discharge and charge DCIRs of the coated electrode by correspondingly lowering the electrical resistance and tortuosity. Specifically, lowering the electrical resistance of the coated electrode may lower an ohmic (DC) resistance, which is one component of DCIR. Further, by lowering the tortuosity of the coated electrode, ionic conduction therethrough may be improved, further decreasing the ohmic resistance and Li-ion diffusion resistance in the coating layers. In some examples, the improved electrochemical performance of the dual-layered configuration may extend to lower temperature regimes, for example, less than 0° C., where lower DCIR and higher power may be attained relative to the single-layer configurations described herein.

Referring now to FIG. 6, a plot 600 illustrating capacity retention during cycling of each of two exemplary coated electrodes is shown, where the two exemplary coated electrodes are the exemplary electrodes TL0-1 and TL0-2 described above. The capacity retention of each of the exemplary coated electrodes TL0-1 and TL0-2 is depicted in the plot 600 by triangular points 601 and square points 602. As such, the capacity retention is represented by an ordinate (in %). The capacity retentions were collected over more than 140 charge/discharge cycles at 25° C., the charging being conducted at 0.33 C and the discharging being conducted at 1 C.

As indicated by the points 601, when the high weight ratio of CMC and SBR binders is employed through (as in the exemplary coated electrode TL0-1), a capacity retention of a given coated electrode may be correspondingly low. However, and as indicated by the points 602, when a dual-layered configuration is employed (as in the exemplary coated electrode TL0-2), wherein the high weight ratio of the CMC and SBR binders is employed in a coating layer nearer to a current collector at a lower loading and the low weight ratio of the CMC and SBR binders is employed in a coating layer farther from the current collector at a higher loading, a capacity retention of a corresponding electrode may be higher than the high weight ratio example. In some examples, a capacity retention after 100 cycles of a coated electrode having the dual-layered configuration (such as the exemplary coated electrode TL0-2) may be about 6% greater than a capacity retention after 100 cycles of a coated electrode having the low weight ratio of CMC and SBR binders throughout (such as the exemplary coated electrode TL0-1). In some examples, the capacity retention of the coated electrode having the dual-layered configuration may be about 7% less than the capacity retention of the coated electrode having the low weight ratio of CMC and SBR binders throughout. In some examples, the capacity retention of the coated electrode having the dual-layered configuration may be about 8% less than the capacity retention of the coated electrode having the low weight ratio of CMC and SBR binders throughout. In some examples, the capacity retention of the coated electrode having the dual-layered configuration may be about 9% less than the capacity retention of the coated electrode having the low weight ratio of CMC and SBR binders throughout. In some examples, the capacity retention of the coated electrode having the dual-layered configuration may be about 10% less than the capacity retention of the coated electrode having the low weight ratio of CMC and SBR binders throughout.

In the dual-layered configuration, configuring the coating layer nearer to the current collector of the coated electrode with the lower weight ratio of the CMC and SBR binders may contribute to reducing a polarization degree of the coated electrode by correspondingly lowering the electrical resistance. In examples wherein the coated electrode is an anode, the reduced polarization degree may reduce deleterious side reactions, such as electrolyte reduction, and minimize lithium plating at surfaces of the anode.

In this way, a multi-layered coated electrode may provide an additional dimension for improving electrochemical performance by providing a composition gradient structure. Generally, single-layered coated electrodes may have limitations as to power, fast charge capability, and energy density when high coating weights are employed, for example, when designing battery cells for electric vehicles having long driving ranges. Specifically, lower weight ratios of the binder may reduce adhesion, resulting in delamination issues and lower cell production yield, whereas higher weight ratios of the binder may increase DCIR, resulting in unsatisfactory electrochemical performance.

In contrast, the multi-layered coated electrode described herein may balance such considerations by providing a lower loading of the higher weight ratio of the binder nearer to the current collector and a higher loading of the lower weight ratio the binder farther from the current collector. Accordingly, including the multi-layered coated electrode in a battery cell may increase the cell production yield by increasing adhesion to reduce delamination. Further, the electrochemical performance of the battery cell may be improved by reducing DCIR to provide faster kinetics during charging and discharging, and increased electrochemical power and fast charge capability (that is, faster charge rates may be realized). Additionally, by increasing loadings and calendering densities in the multi-layered coated electrode, thereby decreasing electrode thicknesses and increasing electrode densities, an energy density of the battery cell including the multi-layered coated electrode may increase, as a higher weight ratio of an active material in denser coating layers may be employed.

Certain electrode formation processes may preclude at least some of the multi-layered coating configurations described herein. In some examples, a slurry may be formed and coated onto a current collector, whereby the slurry may be dried and calendered on the current collector to form an initial coating layer. When an additional coating layer is formed on the initial coating layer opposite the current collector, a layer-to-layer adhesion therebetween may be less than desirable. Accordingly, and as described in detail below with reference to FIGS. 7 and 8, the inventors have herein further provided a "wet-on-wet" coating technique wherein two slurries may be simultaneously coated onto a current collector and then dried and calendered together, such that intermixing of the slurries may occur at an interface therebetween. In this way, an intermixed interfacial region may be developed which maximizes adhesion between coating layers in a multi-layered coated electrode, in addition to providing a smoother composition gradient between the coating layers.

Referring now to FIG. 7, a flow chart depicting a method 700 for forming a multi-layered coated electrode by simultaneously coating multiple slurries onto a current collector and forming respective coating layers thereon is shown. Specifically, compositions of the slurries may be independently selected to minimize a DCIR of the formed multi-layered coated electrode and maximize an adhesion between the current collector and the formed coating layers. In one example, the formed multi-layered coated electrode may be implemented in a battery cell, such as a lithium-ion battery cell, where the cell may be one of a plurality of similarly configured battery cells in a battery pack. In some examples, method 700 may employ or form the components described above with reference to FIG. 1. For example, the coating layers may be the first and second coating layers 111, 112 and the multi-layered coated electrode may be the multi-layered coated electrode 101.

At 702, method 700 may include forming a plurality of slurries including at least a first slurry and a second slurry, where each of the first and second slurries may include a binder, the second slurry having less of the binder by weight than the first slurry. Accordingly, the first and second slurries may have different compositions from one another. For example, each of the first and second slurries may include the binder, a conductive additive, and an active material, wherein at least one of the binder, the conductive additive, and the active material may have a different composition or may be included in a different amount by weight. However, in other examples, the first slurry may include no active material.

In some examples, the binder in the first and second slurries may independently include one or more of SBR, CMC, an acrylate polymer, an acrylate-SBR copolymer, an acrylate-coated SBR, and PVDF. In some examples, the binder may be included in the first slurry at a first weight ratio of greater than 2.8 wt % and the binder may be included in the second slurry at a weight ratio of less than or equal to 2.8 wt %.

In some examples, the conductive additive in the first and second slurries may independently include one or more of CNTs and carbon black. In some examples, the conductive additive may be included in the first slurry at a third weight ratio of less than or equal to 0.5 wt % and the conductive additive may be included in the second slurry at a fourth weight ratio of less than or equal to 1.3 wt %.

In some examples, the active material in the first and second slurries may independently include one or more of graphite, an NCM, an LFP, an NCA, an LCO, an LMNO, an LMO, an LCP, an LNP, and an LMP. In some examples, the active material may be included in the first slurry in a fifth weight ratio and the active material may be included in the second slurry in a sixth weight ratio, wherein the sixth weight ratio is greater than the fifth weight ratio.

Each of the binder, the conductive additive, and the active material may be included in the first and second slurries in the form of particles. The particles of each of the binder, the conductive additive, and the active material may independently be milled according to a predetermined PSD. In some examples, the PSD may be a bimodal PSD including a first mode of particles having a smaller average size (for example, less than or equal to 1 µm) and a second mode of larger particles having a larger average size (for example, less than or equal to 9 µm). Accordingly, the particles of each of the binder, the conductive additive, and the active material may independently be milled via a bill or attrition milling process for a selected period depending on the smaller and larger average sizes. In one example, a volume may be half-filled with an inert media, such as YTZ® grinding media, of <5 mm size and at least some of the particles. The volume may be milled to produce a finer powder with an average size of less than 1 µm.

After milling, the binder, the conductive additive, and the active material may be mixed in a solvent (such as water or a non-aqueous solvent, such as NMP) in two containers according to a first composition and a second composition to respectively form the first and second slurries.

It will be appreciated that, though the method 700 is described herein with reference to the first and second slurries, the plurality of slurries may include additional slurries of different compositions to the first and second slurries, such that more than two coating layers may be formed. However, in other examples, the plurality of slurries may include the first and second slurries and no additional slurries.

At 704, method 700 may include simultaneously coating a current collector with the first slurry and the second slurry to respectively form a first coating layer and a second coating layer. Specifically, at 706, the method 700 may include disposing the first slurry on a surface of the current collector at a first loading to form the first coating layer and, at 708, the method 700 may include disposing the second slurry on the first coating layer opposite the current collector at a second loading to form the second coating layer, where the second loading may be greater than the first loading (for example, a ratio of the first loading to the second loading may be less than 1:2). Accordingly, steps 706 and 708 may occur simultaneously. It will be appreciated that, when referring to slurry coating processes, "simultaneously" as used herein may refer to coating at least two slurries within 30 seconds of one another.

In some examples, the simultaneous coating of the current collector with the first and second slurries may be performed using a slot die technique. As an example, the simultaneous coating of the current collector with the first and second slurries may be performed with a multi-nozzle slot die, such as a dual-nozzle slot die. As another example, the simultaneous coating of the current collector with the first and second slurries may be performed with two slot dies positioned adjacent to one another. Exemplary slot die configurations for the methods provided herein are described in detail below with reference to FIG. 8.

It will be appreciated that the first and second slurries may remain separate from one another (for example, in two separate containers) until simultaneous coating of the current collector. Accordingly, the first and second slurries may be separately fed into a coating device, such as a slot die, whereby simultaneous coating of the current collector with the first and second slurries may respectively be controlled by two feeding rate control systems. As such, the first and second slurries may be coated at different speeds and different loadings.

Because the first and second slurries are simultaneously coated on the current collector prior to drying, the coating step of method 700 may be considered a "wet-on-wet" coating technique. In some examples, at an interfacial region of the first and second slurries, intermixing therebetween may occur, where at least some liquid and solid components of each of the first and second slurries may percolate into one another. As such, adhesion between coating layers formed from the first and second slurries may be increased, and a composition gradient therebetween may be made smoother.

Following simultaneous coating of the current collector with the first and second slurries, at 710, method 700 may include drying the coated current collector. Specifically, drying the coated current collector may include evaporating the solvent from the first and second slurries at a temperature of 150° C. or less.

At 712, method 700 may include calendering the (dried) coated current collector at a predetermined calendering density to form the first and second coating layers. In some examples, the predetermined calendering density may be greater than or equal to 1.7 g/cc. In some examples, method 700 may be repeated for a surface of the current collector opposite to the surface coated with the first and second coating layers, such that a multi-layered coated electrode may be formed. In other examples, the multi-layered coated electrode may be considered formed following coating of one surface of the current collector. In some examples, the formed multi-layered coated electrode may then be implemented in a battery cell, such as a lithium-ion battery cell. Further, the battery cell may be implemented in a battery pack, such as a battery pack for an electric or hybrid-electric vehicle, the battery pack including one or more substantially similar battery cells. Method 700 may then end.

Referring now to FIG. 8, a schematic diagram 800 illustrating three exemplary slot die configurations 820, 840, 860 for simultaneously depositing two slurries onto a current collector sheet 810 is shown. Specifically, a first slurry 801 may be deposited or coated on the current collector sheet 810, and a second slurry 802 may be deposited on the first slurry 801 opposite the current collector sheet 810, such that an interfacial region 803 may be formed between the first and second slurries 801, 802. It will be appreciated that a coating speed of the first and second slurries 801, 802 may depend upon a length of a dryer (not shown) coupled to a given slot die configuration, as well as a temperature and an air flow rate within the dryer. As an example, the coating speed may be between 0.3 and 10 m/min when the length of the dryer is between 1 and 5 m. As another example, the coating speed may be between 5 and 40 m/min when the length of the dryer is between 5 and 30 m. In additional or alternative examples, the temperature of the dryer may be between 50 and 150° C. In additional or alternative examples, the air flow rate within the dryer may be between 10 and 60 Hz for supplying and exhausting when the length of the dryer is between 5 and 30 m.

The dryer may be positioned to receive each of the first and second slurries 801, 802 following coating on the current collector sheet 810, such that the first and second slurries 801, 802 may be dried and calendered simultaneously. Specifically, the current collector sheet 810 having the two slurries deposited thereon may be cut, and the first and second slurries 801, 802 may be simultaneously dried and calendered to form a multi-layered coated electrode 880. In some examples, the multi-layered coated electrode 880 may be the multi-layered coated electrode 101 of FIG. 1. Accordingly, in some examples, any of the three exemplary slot die configurations 820, 840, 860 may be employed in method 700 to form a multi-layered coated electrode for a battery cell, as described above in detail with reference to FIG. 7.

As a first example, the exemplary slot die configuration 820 may include a dual-nozzle slot die 811 and a roller 812. As shown, the dual-nozzle slot die 811 may include each of a first nozzle 821 having a first width 823 and a second nozzle 822 having a second width 824, where the first nozzle 821 may be configured to dispose the first slurry 801 on the current collector sheet 810 and the second nozzle 822 may be configured to dispose the second slurry 802 on the current collector sheet 810. Accordingly, in some examples, the first width 823 may be less than the second width 824, such that the first slurry 801 may be disposed on the current collector sheet 810 at a lower loading than the second slurry 802. As further shown, the current collector sheet 810 may be fed through the exemplary slot die configuration 820 via the roller 812.

In some examples, the dual-nozzle slot die 811 may be positioned adjacent to the roller 812 such that the first slurry 801 may be disposed on the current collector sheet 810 as the current collector sheet 810 is fed through the exemplary slot die configuration 820 by the roller 812. Simultaneously, or immediately thereafter, the dual-nozzle slot die 811 may dispose the second slurry 802 on the first slurry 801 disposed on the current collector sheet 810. Accordingly, the first and second slurries 801, 802 may be dispersed on the current collector sheet 810 via the exemplary slot die configuration 820 prior to drying of either of the first and second slurries 801, 802, such that the interfacial region 803 may be formed between the first and second slurries 801, 802. The interfacial region 803 may therefore include components of each of the first and second slurries 801, 802, for example, in a composition gradient structure.

As a second example, the exemplary slot die configuration 840 may include a first slot die 813*a*, a second slot die 813*b*, and a roller 814. As shown, the first slot die 813*a* may include a first nozzle 841 having a first width 843 and the second slot die 813*b* may include a second nozzle 842 having a second width 844, where the first nozzle 841 may be configured to dispose the first slurry 801 on the current collector sheet 810 and the second nozzle 842 may be configured to dispose the second slurry 802 on the current collector sheet 810. Accordingly, in some examples, the first width 843 may be less than the second width 844, such that the first slurry 801 may be disposed on the current collector sheet 810 at a lower loading than the second slurry 802. In some examples, the first and second slot dies 813*a*, 813*b* may be positioned directly adjacent to one another, such that the first and second slot dies 813*a*, 813*b* may be in face-sharing contact with one another. In other examples, and as shown in the schematic diagram 800, the first and second slot dies 813*a*, 813*b* may be positioned such that a space may be formed therebetween. As an example, the first and second slot dies 813*a*, 813*b* may be positioned within five meters of one another. As another example, the first and second slot dies 813*a*, 813*b* may be positioned within one meter of one another. In some examples, the roller 814 may be configured substantially similarly to the roller 812. Accordingly, the current collector sheet 810 may be fed through the exemplary slot die configuration 840 via the roller 814.

In some examples, the first slot die 813*a* may be positioned adjacent to the roller 814 such that the first slurry 801 may be disposed on the current collector sheet 810 as the current collector sheet 810 is fed through the exemplary slot die configuration 840 by the roller 814. Similarly, the second slot die 813*b* may be positioned adjacent to the roller 814 such that the second slurry 802 may be disposed on the first slurry 801 disposed on the current collector sheet 810 as the current collector sheet 810 is fed through the exemplary slot die configuration 840 by the roller 814. The first and second slurries 801 or 802 may be disposed on the current collector sheet 810 simultaneously, as an example, within 30 seconds of one another or, as another example, within 10 seconds of one another. Accordingly, the first and second slurries 801, 802 may be dispersed on the current collector sheet 810 via the exemplary slot die configuration 840 prior to drying of either of the first and second slurries 801, 802, such that the interfacial region 803 may be formed between the first and second slurries 801, 802. The interfacial region 803 may therefore include components of each of the first and second slurries 801, 802.

As a third example, the exemplary slot die configuration 860 may include a first slot die 815*a*, a second slot die 815*b*, a first roller 816*a*, and a second roller 816*b*. As shown, the first slot die 815*a* may include a first nozzle 861 having a first width 863 and the second slot die 815*b* may include a second nozzle 862 having a second width 864, where the first nozzle 861 may be configured to dispose the first slurry 801 on the current collector sheet 810 and the second nozzle 862 may be configured to dispose the second slurry 802 on the current collector sheet 810. Accordingly, in some examples, the first width 863 may be less than the second width 864, such that the first slurry 801 may be disposed on the current collector sheet 810 at a lower loading than the second slurry 802. In some examples, the first and second slot dies 815*a* and 815*b* may be positioned directly adjacent to one another, such that the first and second slot dies 815*a*,

815b may be in face-sharing contact with one another. In other examples, and as shown in the schematic diagram 800, the first and second slot dies 815a, 815b may be positioned such that a space may be formed therebetween. As an example, the first and second slot dies 815a, 815b may be positioned within five meters of one another. As another example, the first and second slot dies 815a, 815b may be positioned within one meter of one another. Accordingly, the first and second slot dies 815a, 815b may be configured substantially similarly to the first and second slot dies 813a, 813b. In some examples, the first and second rollers 816a, 816b may be positioned directly adjacent to one another, such that the first and second rollers 816a, 816b may be in face-sharing contact with one another. In other examples, and as shown in the schematic diagram 800, the first and second rollers 816a, 816b may be positioned within such that a space may be formed therebetween. As an example, the first and second rollers 816a, 816b may be positioned five meters of one another. As another example, the first and second rollers 816a, 816b may be positioned within one meter of one another. As shown, the first and second rollers 816a, 816b may be positioned such that the current collector sheet 810 may be fed through the exemplary slot die configuration 860 via the first and second rollers 816a, 816b.

In some examples, the first slot die 815a may be positioned adjacent to the first roller 816a such that the first slurry 801 may be disposed on the current collector sheet 810 as the current collector sheet 810 is fed through the exemplary slot die configuration 840 by the first roller 816a. Similarly, the second slot die 815b may be positioned adjacent to the second roller 816b such that the second slurry 802 may be disposed on the first slurry 801 disposed on the current collector sheet 810 as the current collector sheet 810 is fed through the exemplary slot die configuration 860 by the second roller 816b. The first and second slurries 801 or 802 may be disposed on the current collector sheet 810 simultaneously, as an example, within 30 seconds of one another or, as another example, within 10 seconds of one another. Accordingly, the first and second slurries 801, 802 may be dispersed on the current collector sheet 810 via the exemplary slot die configuration 860 prior to drying of either of the first and second slurries 801, 802, such that the interfacial region 803 may be formed between the first and second slurries 801, 802. The interfacial region 803 may therefore include components of each of the first and second slurries 801, 802.

As respectively represented by directional arrows 830, 850, and 870, after the current collector sheet 810 is coated with each of the first and second slurries 801, 802 via the exemplary slot die configuration 820 and the exemplary slot die configuration 840, the current collector sheet 810 may be cut to form the current collector 890, and the first and second slurries 801, 802 disposed thereon may be dried and calendered together to respectively form first and second coating layers 881, 882 and an interfacial region 883 therebetween. As such, the multi-layered coated electrode 880 may be formed including the first and second coating layers 881, 882 coated on the current collector 890. Though a first side 891 of the current collector 890 is shown in FIG. 8 as being coated with the first and second coating layers 881, 882, it will be appreciated that a second side 892 opposite the first side 891 may similarly be coated via one of the exemplary slot die configurations 820, 840, 860 to form the multi-layered coated electrode 880. In this way, two slurries may be simultaneously coated onto a current collector prior to drying of either of the two slurries via a slot die configuration having at least two nozzles.

Though the present disclosure is generally directed to lithium-ion battery cell chemistry, it will be appreciated that principles, elements, and concepts disclosed herein may be applied to forming electrodes for other types of battery cells. Further, it will be appreciated that further high-power and high-energy applications may be contemplated within the scope of the present disclosure for the principles, elements, and concepts disclosed herein in addition to vehicle batteries.

In this way, a lithium-ion battery is provided having a multi-layered coated electrode. The multi-layered coated electrode may include a current collector having first and second coating layers disposed thereon, each of the first and second coating layers including a binder. Specifically, the first coating layer may have an increased amount of binder by weight as compared to the second coating layer. Further, the first coating layer may be coated on the current collector at a lower loading than the second coating layer. A technical effect of increasing binder content while decreasing the loading of the first coating layer relative to the second coating layer is that direct current internal resistance may be reduced while adhesion may be increased at interfaces between the current collector and coating layers. In some examples, each of the first and second coating layers may have a calendering density of greater than or equal to 1.7 g/cc. In additional or alternative examples, particles forming the first and second coating layers may have a bimodal particle size distribution (PSD), such that smaller particles may be disposed in gaps between large particles. A technical effect of increasing the calendering density of the first and second coating layers, as well as the bimodal PSD, is that thinner coating layers with higher loadings may be formed, which may concomitantly increase an energy density of the multi-layered coated electrode.

In one example, an electrode comprises a current collector having two opposing sides, wherein at least one of the two opposing sides is configured with a first coating layer disposed on the current collector at a first loading, where the first coating layer comprises a first binder in a first weight ratio, and a second coating layer disposed on the first coating layer at a second loading, such that the first coating layer is interposed between the current collector and the second coating layer, where the second coating layer comprises a second binder in a second weight ratio, wherein the first weight ratio is greater than the second weight ratio, and wherein a ratio of the first loading to the second loading is less than 1:2. A first example of the electrode further includes wherein the ratio of the first loading to the second loading is greater than or equal to 1:100 and less than or equal to 1:3. A second example of the electrode, optionally including the first example of the electrode, further includes wherein an average calendering density of the first and second coating layers is greater than 1.6 g/cc and less than 2.0 g/cc. A third example of the electrode, optionally including one or more of the first and second examples of the electrode, further includes wherein a calendering density of each of the first and second coating layers is greater than or equal to 1.7 g/cc. A fourth example of the electrode, optionally including one or more of the first through third examples of the electrode, further includes wherein the first coating layer has a first thickness, wherein the second coating layer has a second thickness, and wherein a ratio of the first thickness to the second thickness is greater than or equal to 1:99 and less than or equal to 3:7. A fifth example of the electrode, optionally including one or more of the first through fourth examples of the electrode, further includes wherein the ratio of the first thickness to the second thickness is greater than or equal to 1:99 and less than 1:9. A sixth example of the electrode, optionally including one or more of the first through fifth examples of the electrode, further includes wherein each of the first and second binders independently comprises one or more of polystyrene-butadiene rubber (SBR), carboxymethyl cellulose (CMC), an acrylate polymer, an acrylate-SBR copolymer, and an acrylate-coated SBR. A seventh example of the electrode, optionally including one or more of the first through sixth examples of the electrode, further includes wherein the first binder comprises the acrylate-SBR copolymer, the acrylate-coated SBR, or another combination of SBR and the acrylate polymer. An eighth example of the electrode, optionally including one or more of the first through seventh examples of the electrode, further includes wherein the first binder has a lower glass transition temperature than the second binder. A ninth example of the electrode, optionally including one or more of the first through eighth examples of the electrode, further includes wherein the first weight ratio is greater than 2.8 wt % and the second weight ratio is 2.8 wt % or less. A tenth example of the electrode, optionally including one or more of the first through ninth examples of the electrode, further includes wherein a ratio of the second weight ratio to the first weight ratio is less than or equal to 1:1.3. An eleventh example of the electrode, optionally including one or more of the first through tenth examples of the electrode, further includes wherein the first coating layer further comprises a first conductive additive in a third weight ratio, wherein the second coating layer further comprises a second conductive additive in a fourth weight ratio, and wherein each of the first and second conductive additives independently comprises one or more of carbon black and carbon nanotubes (CNTs). A twelfth example of the electrode, optionally including one or more of the first through eleventh examples of the electrode, further includes wherein the third weight ratio is greater than or equal to the fourth weight ratio. A thirteenth example of the electrode, optionally including one or more of the first through twelfth examples of the electrode, further includes wherein an average weight ratio of the third and fourth weight ratios is greater than or equal to 0.3 wt %. A fourteenth example of the electrode, optionally including one or more of the first through thirteenth examples of the electrode, further includes wherein a ratio of a total weight ratio of the first and second conductive additives to a total weight ratio of the first and second binders is greater than or equal to 21%. A fifteenth example of the electrode, optionally including one or more of the first through fourteenth examples of the electrode, further includes wherein a ratio of the fourth weight ratio to the second weight ratio is greater than or equal to 27%. A sixteenth example of the electrode, optionally including one or more of the first through fifteenth examples of the electrode, further includes wherein at least one of the first and second coating layers further comprises an electrochemically active material. A seventeenth example of the electrode, optionally including one or more of the first through sixteenth examples of the electrode, further includes wherein the electrochemically active material comprises graphite. An eighteenth example of the electrode, optionally including one or more of the first through seventeenth examples of the electrode, further includes wherein the first coating layer comprises the electrochemically active material in a fifth weight ratio, wherein the second coating layer comprises the electrochemically active material in a sixth weight ratio, and wherein the sixth weight ratio is greater than the fifth weight ratio. A nineteenth example of the electrode, optionally including one or more of the first through eighteenth examples of the electrode, further includes wherein particles of the electrochemically active material in the first coating layer have a D50 size of less than or equal to 9 µm. A twentieth example of the electrode, optionally including one or more of the first through nineteenth examples of the electrode, further includes wherein each of the first and second coating layers comprises particles of the electrochemically active material, and wherein the particles of the electrochemically active material in the first coating layer have a lower D50 size than the particles of the electrochemically active material in the second coating layer. A twenty-first example of the electrode, optionally including one or more of the first through twentieth examples of the electrode, further includes wherein each of the first and second coating layers comprises particles of the electrochemically active material, and wherein the particles of the electrochemically active material in the first coating layer have a greater D50 size than the particles of the electrochemically active material in the second coating layer. A twenty-second example of the electrode, optionally including one or more of the first through twenty-first examples of the electrode, further includes wherein each of the first and second binders comprises polyvinylidene fluoride. A twenty-third example of the electrode, optionally including one or more of the first through twenty-second examples of the electrode, further includes wherein the electrochemically active material comprises a first electrochemically active material and a second electrochemically active material, wherein the first coating layer comprises the first electrochemically active material, wherein the second coating layer comprises the second electrochemically active material, and wherein each of the first and second electrochemically active materials independently comprises one or more of a lithium nickel cobalt manganese oxide, a lithium iron phosphate, a lithium nickel cobalt aluminum oxide, a lithium cobalt oxide, a lithium manganese nickel oxide, a lithium manganese oxide, a lithium cobalt phosphate, a lithium nickel phosphate, and a lithium manganese phosphate. A twenty-fourth example of the electrode, optionally including one or more of the first through twenty-third examples of the electrode, further includes wherein the first electrochemically active material and the second electrochemically active material have different compositions. A twenty-fifth example of the electrode, optionally including one or more of the first through twenty-fourth examples of the electrode, further includes wherein the first electrochemically active material comprises a first lithium nickel cobalt manganese oxide having a first nickel stoichiometric content of 70-95% relative to a first total nickel, cobalt, and manganese stoichiometric content of the first lithium nickel cobalt manganese oxide, and wherein the second electrochemically active material comprises a second lithium nickel cobalt manganese oxide having a second nickel stoichiometric content of 50-80% relative to a second total nickel, cobalt, and manganese stoichiometric content of the second lithium nickel cobalt manganese oxide. A twenty-sixth example of the electrode, optionally including one or more of the first through twenty-fifth examples of the electrode, further includes wherein each of the first and second coating layers further comprises the electrochemically active material in the form of particles, particles of the electrochemically active material in a thicker coating layer of the first and second coating layers having a lower D50 size than particles of the electrochemically active material in a thinner coating layer of the first and second coating layers. A twenty-seventh example of the electrode, optionally including one or more of the first through twenty-sixth examples of the electrode, further includes wherein a D50 size of particles of the electrochemically active material in the thicker coating layer is 5 to 99.5% of a D50 size of particles of the electrochemically active material in the thinner coating layer.

In another example, a multi-layered coated electrode comprises a current collector having two sides, the two sides opposite to one another, wherein each respective side of the two sides is configured with a first coating layer disposed in face-sharing contact with the respective side of the current collector, the first coating layer comprising a binder in a first weight ratio and a first conductive additive in a second weight ratio, and a second coating layer disposed on the first coating layer opposite to the particular side of the current collector, the second coating layer comprising the binder in a third weight ratio, a second conductive additive in a fourth weight ratio, and an electrochemically active material, wherein the first weight ratio is greater than the third weight ratio, and wherein the first coating layer comprises no electrochemically active material. In some examples of the multi-layer coated electrode, the multi-layered coated electrode may be configured as one or both of an anode and a cathode in a lithium-ion battery cell. A first example of the multi-layered coated electrode further includes wherein the first conductive additive comprises CNTs and the second conductive additive comprises carbon black. A second example of the multi-layered coated electrode, optionally including the first example of the multi-layered coated electrode, further includes wherein the first conductive additive has a greater surface area than the second conductive additive. A third example of the multi-layered coated electrode, optionally including one or more of the first and second examples of the multi-layered coated electrode, further includes wherein the second weight ratio is greater than or equal to 0.3 wt %. A fourth example of the multi-layered coated electrode, optionally including one or more of the first through third examples of the multi-layered coated electrode, further includes wherein the fourth weight ratio is less than or equal to 1.3 wt %. A fifth example of the multi-layered coated electrode, optionally including one or more of the first through fourth examples of the multi-layered coated electrode, further includes wherein the electrochemically active material is in the form of particles having a bimodal particle size distribution or a trimodal particle size distribution.

In yet another example, a lithium-ion battery cell comprises an anode, and a cathode, wherein one or both of the anode and the cathode comprise a current collector having two opposing sides, each of the two opposing sides being configured with a first coating layer disposed on the current collector, the first coating layer comprising a binder in a first weight ratio, and a second coating layer disposed on the first coating layer opposite the current collector, the second coating layer comprising the binder in a second weight ratio, wherein the first weight ratio is greater than the second weight ratio, and wherein each of the first and second coating layers is formed from particles having a bimodal particle size distribution or a trimodal particle size distribution. A first example of the lithium-ion battery cell further includes wherein each of the two opposing sides is further configured with an interfacial region overlapping each of the first coating layer and the second coating layer, the interfacial region comprising a portion of the first coating layer intermixed with a portion of the second coating layer, where remaining portions of the first and second coating layers are not mixed with one another and are not included in the interfacial region. A second example of the lithium-ion battery cell, optionally including the first example of the lithium-ion battery cell, further includes wherein each of the two opposing sides is further configured with a third coating layer disposed on the second coating layer opposite the first coating layer, the third coating layer comprising the binder in a third weight ratio, wherein the second weight ratio is greater than the third weight ratio. A third example of the lithium-ion battery cell, optionally including one or more of the first and second examples of the lithium-ion battery cell, further includes wherein the first coating layer further comprises a conductive additive in a fourth weight ratio, wherein the second coating layer further comprises the conductive additive in a fifth weight ratio, and wherein each of the fourth and fifth weight ratios is less than or equal to 1.3 wt %.

In yet another example, a method comprises forming a first slurry and a second slurry, where each of the first and second slurries comprise a binder, the second slurry having less of the binder by weight than the first slurry, simultaneously coating a current collector with the first and second slurries to respectively form a first coating layer and a second coating layer, drying the coated current collector, and calendering the coated current collector at a predetermined calendering density. A first example of the method further includes wherein simultaneously coating the current collector with the first and second slurries to respectively form the first and second coating layers comprises simultaneously disposing the first slurry on the current collector at a first loading to form the first coating layer, and disposing the second slurry on the first slurry at a second loading to form the second coating layer, wherein a ratio of the first loading to the second loading is less than 1:2. A second example of the method, optionally including the first example of the method, further includes wherein simultaneous coating of the current collector with the first and second slurries is performed with a multi-nozzle slot die. A third example of the method, optionally including one or more of the first and second examples of the method, further includes wherein simultaneous coating of the current collector with the first and second slurries is performed with a slot die configuration including two slot dies being positioned within five meters of one another. A fourth example of the method, optionally including one or more of the first through third examples of the method, further includes wherein simultaneous coating of the current collector with the first and second slurries is performed with a slot die configuration including two rollers positioned within five meters of one another. A fifth example of the method, optionally including one or more of the first through fourth examples of the method, further includes wherein simultaneously coating the current collector with the first and second slurries comprises coating the first slurry with a first slot die nozzle, and coating the second slurry with a second slot die nozzle, wherein the first slot die nozzle has a first width and the second slot die nozzle has a second width, the first width less than the second width. A sixth example of the method, optionally including one or more of the first through fifth examples of the method, further includes wherein the first and second slurries remain separate until simultaneous coating of the current collector, and wherein simultaneous coating of the current collector with the first and second slurries is respectively controlled by two feeding rate control systems, whereby the first and second slurries are coated at different speeds and different loadings.

The following claims particularly point out certain combinations and sub-combinations regarded as novel and non-obvious. These claims may refer to "an" element or "a first"

element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An electrode, comprising:
 a current collector having two opposing sides, wherein at least one of the two opposing sides is configured with:
  a first coating layer disposed on the current collector at a first loading, where the first coating layer comprises a first binder in a first weight ratio, and
  a second coating layer disposed on the first coating layer at a second loading, such that the first coating layer is interposed between the current collector and the second coating layer, where the second coating layer comprises a second binder in a second weight ratio,
 wherein each of the first and second coating layers further comprises an electrochemically active material in the form of particles, particles of the electrochemically active material in a thicker coating layer of the first and second coating layers having a lower D50 size than particles of the electrochemically active material in a thinner coating layer of the first and second coating layers,
 wherein the first weight ratio is greater than the second weight ratio, and
 wherein a ratio of the first loading to the second loading is less than 1:2.

2. The electrode of claim 1, wherein the ratio of the first loading to the second loading is greater than or equal to 1:100 and less than or equal to 1:3.

3. The electrode of claim 1, wherein an average calendering density of the first and second coating layers is greater than 1.6 g/cc and less than 2.0 g/cc.

4. The electrode of claim 1, wherein a calendering density of each of the first and second coating layers is greater than or equal to 1.7 g/cc.

5. The electrode of claim 1, wherein the first coating layer has a first thickness,
 wherein the second coating layer has a second thickness, and
 wherein a ratio of the first thickness to the second thickness is greater than or equal to 1:99 and less than or equal to 3:7.

6. The electrode of claim 1, wherein each of the first and second binders independently comprises one or more of polystyrene-butadiene rubber (SBR), carboxymethyl cellulose (CMC), an acrylate polymer, an acrylate-SBR copolymer, and an acrylate-coated SBR.

7. The electrode of claim 1, wherein the first coating layer further comprises a first conductive additive,
 wherein the second coating layer further comprises a second conductive additive, and
 wherein each of the first and second conductive additives independently comprises one or more of carbon black and carbon nanotubes (CNTs).

8. The electrode of claim 1, wherein the electrochemically active material comprises graphite.

9. The electrode of claim 1, wherein particles of the electrochemically active material in the first coating layer have a D50 size of less than or equal to 9 µm.

10. The electrode of claim 1, wherein a D50 size of particles of the electrochemically active material in the thicker coating layer is 5 to 99.5% of a D50 size of particles of the electrochemically active material in the thinner coating layer.

11. The electrode of claim 1, wherein each of the first and second binders comprises polyvinylidene fluoride.

12. The electrode of claim 1, wherein the electrochemically active material comprises a first electrochemically active material and a second electrochemically active material,
 wherein the first coating layer comprises the first electrochemically active material,
 wherein the second coating layer comprises the second electrochemically active material, and
 wherein each of the first and second electrochemically active materials independently comprises one or more of a lithium nickel cobalt manganese oxide, a lithium iron phosphate, a lithium nickel cobalt aluminum oxide, a lithium cobalt oxide, a lithium manganese nickel oxide, a lithium manganese oxide, a lithium cobalt phosphate, a lithium nickel phosphate, and a lithium manganese phosphate.

13. A lithium-ion battery cell, comprising:
 an anode; and
 a cathode,
 wherein one or both of the anode and the cathode comprises a current collector having two sides, the two sides opposite to one another, wherein each respective side of the two sides is configured with:
  a first coating layer disposed in face-sharing contact with the respective side of the current collector, the first coating layer comprising a binder in a first weight ratio and a first conductive additive in a second weight ratio, and
  a second coating layer disposed on the first coating layer opposite to the respective side of the current collector, the second coating layer comprising the binder in a third weight ratio, a second conductive additive in a fourth weight ratio, and an electrochemically active material,
 wherein the first weight ratio is greater than the third weight ratio, and
 wherein the first coating layer comprises no electrochemically active material.

14. The lithium-ion battery cell of claim 13, wherein the first conductive additive comprises CNTs and the second conductive additive comprises carbon black.

15. The lithium-ion battery cell of claim 13, wherein the first conductive additive has a greater surface area than the second conductive additive.

16. The lithium-ion battery cell of claim 13, wherein the electrochemically active material is in the form of particles having a bimodal particle size distribution or a trimodal particle size distribution.

17. The lithium-ion battery cell of claim 13, wherein each of the two opposing sides is further configured with an interfacial region overlapping each of the first coating layer and the second coating layer, the interfacial region comprising a portion of the first coating layer intermixed with a portion of the second coating layer, where remaining portions of the first and second coating layers are not mixed with one another and are not included in the interfacial region.

18. The lithium-ion battery cell of claim 13, wherein each of the two opposing sides is further configured with:
- a third coating layer disposed on the second coating layer opposite the first coating layer, the third coating layer comprising the binder in a third weight ratio,
- wherein the second weight ratio is greater than the third weight ratio.

19. A method, comprising:
- forming a first slurry and a second slurry, where each of the first and second slurries comprise a binder, the second slurry having less of the binder by weight than the first slurry, and an electrochemically active material;
- simultaneously coating a current collector with the first and second slurries to respectively form a first coating layer and a second coating layer by simultaneously:
  - disposing the first slurry on the current collector at a first loading to form the first coating layer; and
  - disposing the second slurry on the first slurry at a second loading to form the second coating layer;
- drying the coated current collector; and
- calendering the coated current collector at a predetermined calendering density,
- wherein a ratio of the first loading to the second loading is less than 1:2; and
- wherein a thicker coating layer of the first and second coating layers has a lower D50 particle size of the electrochemically active material than a thinner coating layer of the first and second coating layers.

20. The method of claim 19, wherein simultaneous coating of the current collector with the first and second slurries is performed with a slot die configuration including a multi-nozzle slot die, two slot dies being positioned within five meters of one another, or two rollers being positioned within five meters of one another.

* * * * *